US012804653B2

(12) United States Patent
Healy et al.

(10) Patent No.: US 12,804,653 B2
(45) Date of Patent: Nov. 17, 2026

(54) COMMUNICATION BETWEEN NON-TERRESTRIAL AND TERRESTRIAL NETWORKS BASED ON LAYER-1 PHYSICAL PACKET-LEVEL TRANSCODING

(71) Applicant: Dell Products L.P., Round Rock, TX (US)

(72) Inventors: Michael J. Healy, Scituate, MA (US); Tejinder Singh, Manotick (CA); Navjot Kaur Khaira, Manotick (CA); Qing Ye, Hopkinton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 173 days.

(21) Appl. No.: 18/780,269

(22) Filed: Jul. 22, 2024

(65) Prior Publication Data

US 2026/0025816 A1 Jan. 22, 2026

(51) Int. Cl.
*H04W 72/1273* (2023.01)
*H04W 52/36* (2009.01)
*H04W 84/06* (2009.01)

(52) U.S. Cl.
CPC ..... *H04W 72/1273* (2013.01); *H04W 52/367* (2013.01); *H04W 84/06* (2013.01)

(58) Field of Classification Search
None
See application file for complete search history.

(56) References Cited

U.S. PATENT DOCUMENTS 6,522,116 B1 2/2003 Jordan
10,211,532 B2 2/2019 Foo
(Continued)

FOREIGN PATENT DOCUMENTS

CN 114976664 A 8/2022
CN 117768269 A 3/2024
WO 2021/221603 A1 11/2021

OTHER PUBLICATIONS

Notice of Allowance received for U.S. Appl. No. 18/609,134 dated Sep. 16, 2025, 11 pages.
Non-Final Office Action received for U.S. Appl. No. 18/656,441 dated Sep. 22, 2025, 7 pages.
Notice of Allowance received for U.S. Appl. No. 18/656,441 dated Nov. 19, 2025, 5 pages.
(Continued)

*Primary Examiner* — Chirag G Shah
(74) *Attorney, Agent, or Firm* — Amin, Turocy & Watson, LLP

(57) ABSTRACT

The technology described herein is directed towards a transcoder that can be deployed and used to couple non-terrestrial network satellites to user equipment, including by decoding and reencoding data packets at the packet level. A metasurface (reconfigurable intelligent surface, or RIS) redirects signals from the satellite to a satellite radio frequency (RF) interface of the transcoder, with the transcoder also coupled by a user equipment (UE) RF interface to user equipment, such as a computing device or cellphone. The transcoder converts satellite-originating signals to UE-compliant signals, and converts UE-originating signal to satellite-compliant signals. The transcoder performs various additional conversion-related functions to facilitate such satellite direct-to-device service, including via frequency conversion, doppler manipulation, a repeater, frequency equalization/negative-slope compensation and RIS-related conversion in both the receive mode and transmit mode of the RIS. Various example form factors for implementing and deploying the transcoder and metasurface can be used.

20 Claims, 18 Drawing Sheets

(56) References Cited

U.S. PATENT DOCUMENTS

| | | | | |
|---|---|---|---|---|
| 10,770,790 | B1 | 9/2020 | Mahanfar | |
| 10,931,004 | B2 | 2/2021 | Yoo et al. | |
| 11,133,577 | B2 | 9/2021 | Wang et al. | |
| 11,329,375 | B1 | 5/2022 | West et al. | |
| 11,855,745 | B2 | 12/2023 | Schloemer | |
| 12,452,047 | B1 | 10/2025 | Wang | |
| 12,519,509 | B2 | 1/2026 | Zuo et al. | |
| 2006/0264173 | A1 | 11/2006 | Gilbert | |
| 2013/0249772 | A1 | 9/2013 | Infante et al. | |
| 2014/0319638 | A1 | 10/2014 | Chia | |
| 2015/0380828 | A1 | 12/2015 | Black et al. | |
| 2016/0112117 | A1 | 4/2016 | Platzer et al. | |
| 2018/0062788 | A1* | 3/2018 | Mayer | H04B 7/18521 |
| 2019/0132044 | A1* | 5/2019 | Hreha | H04B 7/185 |
| 2019/0334228 | A1 | 10/2019 | Haridas et al. | |
| 2021/0013619 | A1 | 1/2021 | Alkhateeb et al. | |
| 2022/0021125 | A1 | 1/2022 | Baligh et al. | |
| 2022/0026524 | A1 | 1/2022 | Maruyama et al. | |
| 2022/0085918 | A1* | 3/2022 | Luo | H04L 1/18 |
| 2022/0182116 | A1* | 6/2022 | Raghavan | H04B 7/0617 |
| 2022/0231411 | A1 | 7/2022 | Lin | |
| 2022/0321198 | A1 | 10/2022 | Devoti et al. | |
| 2022/0330273 | A1* | 10/2022 | Kenney | H04W 72/0453 |
| 2022/0337240 | A1 | 10/2022 | Venkatesh et al. | |
| 2023/0099471 | A1 | 3/2023 | Pascucci et al. | |
| 2023/0101393 | A1 | 3/2023 | Dai et al. | |
| 2023/0142735 | A1* | 5/2023 | Raghavan | H04B 7/15557 370/315 |
| 2023/0188170 | A1 | 6/2023 | Dutta et al. | |
| 2023/0254135 | A1 | 8/2023 | Lyons et al. | |
| 2023/0318818 | A1 | 10/2023 | Sinha et al. | |
| 2023/0319507 | A1 | 10/2023 | Gummadi et al. | |
| 2023/0403661 | A1 | 12/2023 | Kim et al. | |
| 2023/0413203 | A1* | 12/2023 | Ryu | H04B 7/18513 |
| 2023/0422051 | A1 | 12/2023 | Soryal | |
| 2024/0014862 | A1 | 1/2024 | Duan et al. | |
| 2024/0080184 | A1 | 3/2024 | Yoshino et al. | |
| 2024/0171239 | A1 | 5/2024 | Wang et al. | |
| 2024/0171447 | A1 | 5/2024 | Hemadeh et al. | |
| 2024/0204998 | A1 | 6/2024 | Yeomans et al. | |
| 2024/0259087 | A1* | 8/2024 | Corey | H04B 7/1851 |
| 2024/0333398 | A1 | 10/2024 | Bush | |
| 2024/0364019 | A1 | 10/2024 | Hussain | |
| 2024/0378930 | A1 | 11/2024 | Motos et al. | |
| 2024/0388361 | A1 | 11/2024 | Duan et al. | |
| 2024/0419404 | A1 | 12/2024 | Burchard et al. | |
| 2024/0429969 | A1 | 12/2024 | Hong et al. | |
| 2025/0062529 | A1 | 2/2025 | Nathan et al. | |
| 2025/0125525 | A1 | 4/2025 | Rossanese et al. | |
| 2025/0175217 | A1 | 5/2025 | Albanese et al. | |
| 2025/0274165 | A1 | 8/2025 | Manolakos et al. | |
| 2025/0343577 | A1 | 11/2025 | Abu Al Haija et al. | |
| 2025/0373340 | A1 | 12/2025 | Abelson et al. | |
| 2026/0046613 | A1 | 2/2026 | Elshafie et al. | |

OTHER PUBLICATIONS

Notice of Allowance received for U.S. Appl. No. 18/739,880 dated Nov. 12, 2025, 10 pages.

Notice of Allowance received for U.S. Appl. No. 18/797,975 dated Sep. 19, 2025, 9 pages.

qorvo.com, "CMD262 26-28 GHz (Ka Band) GaN Power Amplifier", Rev-A, URL- https://www.qorvo.com/products/p/CMD262, Jun. 14, 2022, 1 page.

Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.

Long et al., "Active Reconfigurable Intelligent Surface Aided Wireless Communications", IEEE Transactions on Wireless Communications, vol. 20, No. 8, Aug. 2021, pp. 4962-4975.

Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.

Gros et al., "A Reconfigurable Intelligent Surface at mmWave Based on a Binary Phase Tunable Metasurface", IEEE Open Journal of the Communications Society, vol. 2, 2021, pp. 1055-1064.

Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.

Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.

Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.

Ojaroudi et al., "Graphene-Based Reconfigurable Intelligent MetaSurface Structure for THz Communications", 15th European Conference on Antennas and Propagation, 2021, 5 pages.

Tasci et al., "A New RIS Architecture With a Single Power Amplifier: Energy Efficiency and Error Performance Analysis", IEEE Access, Apr. 2022, 11 pages.

Bai et al., "RIS-Assisted Green Secure Communications: Active RIS or Passive Ris?", IEEE Wireless Communications Letters, Dec. 6, 2022, 5 pages.

Goldman et al., "SpaceX and T-mobile Focus on Direct Satellite-to-Smartphone to Improve Mobile Coverage in Remote Areas", Analysys Mason, Aug. 2022, 5 pages.

Jewett, Rachel, "How Big is the Satellite Industry's Direct-to-Device Opportunity?", Via Satellite, Sep. 12, 2023, Url-https://www.satellitetoday.com/connectivity/2023/09/12/how-big-is-the-satellite-industrys-direct-to-device-opportunity/, Retrieved from the internet Dec. 2, 2024, 4 pages.

"Electromagnetic Metasurface", Wikipedia, URL- https://en.wikipedia.org/wiki/Electromagnetic_metasurface#, Retrieved from the internet Dec. 2, 2024, 9 pages.

Schweber, Bill., "The Doppler Effect: From Highly Ridiculed to Absolutely Indispensable, Part 1", Electrical Engineering News and Products, Apr. 19, 2022, URL- https://www.eeworldonline.com/the-doppler-effect-from-highly-ridiculed-to-absolutely-indispensable-part-1/, Retrieved from the internet Dec. 2, 2024, 14 pages.

"Doppler Effect", Wikipedia, URL-https://en.wikipedia.org/wiki/Doppler_effect, Retrieved from the internet Dec. 2, 2024, 8 pages.

Long et al., "A Promising Technology for 6G Wireless Networks: Intelligent Reflecting Surface", Journal of Communications and Information Networks, vol. 6, No. 1, Mar. 2021, 16 pages.

Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.

Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.

Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.

3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.

3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.

3GPP TS 38.108 V17.0.0, 3rd Generation Partnership Project; Technical Specification Group Radio Access Network; NR; Satellite Access Node radio transmission and reception, (Release 17), Jun. 2022, 58 pages.

"DVB", Wikipedia, URL-https://en.wikipedia.org/wiki/DVB, Retrieved from the internet Dec. 2, 2024, 12 pages.

(56) References Cited

OTHER PUBLICATIONS

"DVB-S", Wikipedia, URL-https://en.wikipedia.org/wiki/DVB-S, Retrieved from the internet Dec. 2, 2024, 2 pages.
"DVB-S2", Wikipedia, URL-https://en.wikipedia.org/wiki/DVB-S2, Retrieved from the internet Dec. 2, 2024, 7 pages.
"DVB-S2X", Wikipedia, URL-https://en.wikipedia.org/wiki/DVB-S2X, Retrieved from the internet Dec. 2, 2024, 2 pages.
The Ad Hoc Group., "White Paper on the use of DVB-S2X for DTH Applications, DSNG & Professional Services, Broadband Interactive Services and VL-SNR applications", Digital Video Broadcasting, Mar. 2015, 16 pages.
dvb org., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.
dvb org., "Second Generation Framing Structure, Channel Coding and Modulation Systems for Broadcasting, Interactive Services, News Gathering and Other Broadband Satellite Applications; Part 2: DVB-S2 Extensions (DVB-S2X)", DVB Document A083-2 Rev.4, Feb. 2024, 166 pages.
"Facts and Figures 2022—Mobile Network Coverage 2022", ITU, URL-https://www.itu.int/itu-d/reports/statistics/2022/11/24/ff22-mobile-network-coverage/, Retrieved from the internet Dec. 2, 2024, 4 pages.
Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.
ETSI EN 300 421 V1.1.2, "Digital Video Broadcasting (DVB); Framing Structure, Channel Coding and Modulation for 11/12 Ghz Satellite Services", Aug. 1997, 24 pages.
ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", Jul. 2014, 80 pages.
ETSI EN 302 307 V1.2.1, Digital Video Broadcasting (DVB); Second Generation Framing Structure, Channel Coding And Modulation Systems for Broadcasting, Interactive Services, News Gathering and Other Broadband Satellite Applications (DVB-S2), Aug. 2009, 78 pages.
ETSI TR 102 376-1 V1.2.1, "Digital Video Broadcasting (DVB); Implementation Guidelines for the Second Generation System For Broadcasting, Interactive Services, News Gathering and other Broadband Satellite Applications; Part 1: DVB-S2", Nov. 2015, 118 pages.
ETSI TR 102 376-2 V1.2.1, "Digital Video Broadcasting (DVB); Implementation Guidelines for the Second Generation System for Broadcasting, Interactive Services, News Gathering and other Broadband Satellite Applications; Part 2: S2 Extensions (DVB-S2X)", Jan. 2021, 212 pages.
Lee et al., "Integrated DVB-X2 Receiver Architecture with Common Acceleration Engine", Applied Sciences, vol. 9, No. 3983, Sep. 23, 2019, 16 pages.
Nemer, Elias., "Physical Layer Impairments in DVB-S2 Receivers", Second IEEE Consumer Communications and Networking Conference, 2005, pp. 487-492.
dvb org., "White Paper on the use of DVB-S2X for DTH applications, DSNG & Professional Services, Broadband Interactive Services and VL-SNR applications", DVB Document A172, Mar. 2015, 16 pages.
Babcock, Stephen., "AT&T Invested $450M in Maryland Network Upgrades Over 3 Years", Technical.ly, URL-https://technical.ly/startups/att-invested-450m-in-maryland-network-upgrades-over-3-years/, Jul. 9, 2019, Retrieved from the internet Dec. 2, 2024, 7 pages.
Tyree et al., "AT&T Providing Cell on Wheels to Help with Internet Connection at Lu's Graduation", URL- https://wset.com/news/local/att-providing-cell-on-wheels-to-help-with-internet-connection-at-lus-graduation, May 10, 2017, Retrieved from the internet Dec. 2, 2024, 6 pages.
ITU, "H.222.0 : Information Technology—Generic Coding of Moving Pictures and Associated Audio Information: Systems", International Telecom Union, Aug. 2018, 306 pages.
Cioni et al., "DVB-S2X Physical Layer Performance Results Over Realistic Channel Models", International Journal of Satellite Communications and Networking, vol. 34, No. 3, Jul. 2015, 21 pages.
"MPEG Transport Stream", Wikipedia, URL-https://en.wikipedia.org/wiki/MPEG_transport_stream, Retrieved from the internet Dec. 2, 2024, 10 pages.
Keese, Col. John E., "Satellite Telemetry, Tracking and Control Subsystems", Massachusetts Institute of Technology, Oct. 29, 2003, 35 pages.
NASA, "State-of-the-Art of Small Spacecraft Technology", NASA 9.0 Communications, Feb. 12, 2024, 32 pages.
Stuhlfauth, Reiner. "5G NTN Takes Flight: Technical Overview of 5G Non-Terrestrial Networks", Rohde & Schwarz, White Paper, Version 01.00, 2022, 124 pages.
Dhaou, Riadh. "Modeling of Networks Composed of Satellite Constellations" University of Paris VI Dissertation, Nov. 8, 2002 [https://www.researchgate.netpublication/265231818_MODELING_OF_NETWORKS_COMPOSED_OF_SATELLITE_CONSTELLATIONS], 225 pages.
"Aerial SDK Layer 1" NVIDIA DOCS HUB, https://docs.nvidia.com/aerial/archive/aerial-sdk/23-1/text/product_brief/aerial_sdk_layer_1.html] retrieved Jan. 16, 2025, 30 pages.
Healy, et al. "Layer-1 Physical Interface Transcoder Leveraging Metasurfaces" U.S. Appl. No. 18/899,886, filed Sep. 27, 2024, 63 pages.
Healy, et al. "Connecting Wi-Fi-Enabled Device to Non-Terrestrial Satellite Constellations" U.S. Appl. No. 18/899,909, filed Sep. 27, 2024, 55 pages.
Khaira, et al. "Layer-1 Physical Interface Transcoder With Signal Processing Capabilities to Support Hybrid Terrestrial and Non-Terrestrial Ground and Space Mesh Network" U.S. Appl. No. 18/902,052, filed Sep. 30, 2024,79 pages.
Healy, et al. "Universal Layer-1 Physical Interface Transcoder for Terrestrial and Non-Terrestrial Air-Interfaces" U.S. Appl. No. 18/899,739, filed Sep. 27, 2024, 62 pages.
Singh, et al. "Metasurface Integrated Non-Terrestrial Network Transcoder With Adaptive Slicing for Dynamic Allocation of Mesh Resources" U.S. Appl. No. 18/902,100, filed Sep. 30, 2024, 64 pages.
Singh, et al. "Edge Computing and Metasurfaces in Non-Terrestrial Network-Connected Transcoder Nodes" U.S. Appl. No. 18/902,158, filed Sep. 30, 2024, 66 pages.
Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.
Singh, et al. "Allocating Primary and Secondary Metasurface Integrated Non-Terrestrial Network Transcoder Nodes" U.S. Appl. No. 18/902,360, filed Sep. 30, 2024, 64 pages.
Healy, et al. "Model-Controlled Layer-1 Physical Interface Transcoder to Support Hybrid Terrestrial and Non-Terrestrial Ground and Space Mesh Network" U.S. Appl. No. 18/899,504, filed Sep. 27, 2024, 64 pages.
Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.
Singh, et al. "Secure Non-Terrestrial Network Links Utilizing Quantum Key Distribution Integrated Into a Metasurface Transcoder Node With Hardware Polarization Control" U.S. Appl. No. 18/902,422, filed Sep. 30, 2024, 37 pages.
Singh, et al. "Signal Correction Based on Environmental Factors in Metasurfaces for Non-Terrestrial Network Transcoder Nodes" U.S. Appl. No. 18/902,454, filed Sep. 30, 2024, 53 pages.
Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.

(56) References Cited

OTHER PUBLICATIONS

Khaira, et al. "Energy-Efficient Active Reconfigurable Intelligent Surface With Selective Amplification" U.S. Appl. No. 18/609,134, filed Mar. 19, 2024, 39 pages.
Singh, et al. "Reconfigurable Intelligent Surface Integrated on Compact Drones for Wireless Network Survey" U.S. Appl. No. 18/913,434, filed Oct. 11, 2024, 36 pages.
Singh, et al. "Real-Time Data Management and Integrity Assurance for Artificial Intelligence-Driven Millimeter Wave Advanced Metasurfaces" U.S. Appl. No. 18/656,407, filed May 6, 2024, 44 pages.
Singh, et al. "Reconfigurable Intelligent Surfaces That Self Heal and Adapt by Altering the Tile Geometry" U.S. Appl. No. 18/656,431, filed May 6, 2024, 74 pages.
Singh, et al. "Predictive Signal Boosting in Distributed Tile Controllers for Reconfigurable Metasurfaces" U.S. Appl. No. 18/656,441, filed May 6, 2024, 54 pages.
Ye, et al. "Enhancing Non-Terrestrial Network Direct-To-Everything Service With Metasurfaces" U.S. Appl. No. 18/739,880, filed Jun. 11, 2024, 39 pages.
Singh, et al. "Metasurface Subarrays With Integrated Amplification and Tunable Delay for Estimating Angle of Arrival and Redirecting Wireless Signals" U.S. Appl. No. 18/750,710, filed Jun. 21, 2024, 41 pages.
Healy, et al. "Transcoding the Air-Interface Between Non-Terrestrial and Terrestrial Networks Leveraging Integrated Transcoder and Metasurface Mounted on a Drone" U.S. Appl. No. 18/780,254, filed Jul. 22, 2024, 61 pages.
Singh, et al. "Reconfigurable Intelligent Surface With Variable Amplification and Attenuation Including Angle of Arrival Estimation of Wireless Signals" U.S. Appl. No. 18/797,975, filed Aug. 8, 2024, 46 pages.
Notice of Allowance received for U.S. Appl. No. 18/902,100 dated Mar. 10, 2026, 9 pages.
Notice of Allowance received for U.S. Appl. No. 18/656,407 dated Mar. 19, 2026, 11 pages.
Notice of Allowance received for U.S. Appl. No. 18/750,710 dated Apr. 21, 2026, 12 pages.
Liu et al., "Dynamic-Controlled RIS Assisted Multi-User MISO Downlink System: Joint Beamforming Design", In IEEE Transactions on Green Communications and Networking, vol. 6, No. 2, Jun. 2022, pp. 1069-1081.
Notice of Allowance received for U.S. Appl. No. 18/902,422 dated May 7, 2026, 16 pages.
Liu et al., "Single-Photon Generation and Manipulation in Quantum Nanophotonics", Applied Physics Reviews, vol. 12, Article No. 011308, Jan. 24, 2025, 38 pages.
Sund et al., "Processing Single-Photons from a Quantum Dot Using High-Speed Integrated Photonic Circuits on the Thin Film Lithium-Niobate-on-Insulator Platform", 2023 Conference on Lasers and Electro-Optics (CLEO), 2023, 2 pages.
Silverstone et al., "Monolithic Generation and Manipulation of Nondegenerate Photon Pairs within a Silicon-on-Insulator Quantum Photonic Circuit", 2013 Conference on Lasers & Electro-Optics Europe & International Quantum Electronics Conference CLEO Europe/IQEC, 2013, 1 page.
Non-Final Office Action received for U.S. Appl. No. 18/780,254 dated May 29, 2026, 17 pages.
Non-Final Office Action received for U.S. Appl. No. 18/586,838 dated Jun. 26, 2026, 19 pages.
Final Office Action received for U.S. Appl. No. 18/780,254, dated Jul. 14, 2026, 22 pages.
Non-Final Office Action for U.S. Appl. No. 18/656,431, dated Sep. 1, 2026, 79 pages.

* cited by examiner

COMMUNICATION BETWEEN NON-TERRESTRIAL AND TERRESTRIAL NETWORKS BASED ON LAYER-1 PHYSICAL PACKET-LEVEL TRANSCODING

RELATED APPLICATION

The subject patent application is related to U.S. patent application Ser. No. 18/780,254, filed Jul. 22, 2024, and entitled "TRANSCODING THE AIR-INTERFACE BETWEEN NON-TERRESTRIAL AND TERRESTRIAL NETWORKS LEVERAGING INTEGRATED TRANSCODER AND METASURFACES MOUNTED ON A DRONE", the entirety of which patent application is hereby incorporated by reference herein.

BACKGROUND

Non-terrestrial network communications are defined as part of fifth generation (5G) communications in current third generation partnership project (3GPP) standards. However, the reliability of non-terrestrial network satellite direct-to-device service is problematic, especially when a user equipment (UE) moves to an indoor environment, due to various radio frequency signal attenuations introduced by a roof, wall, or other physical structures that are between a satellite and the UE. As such, present satellite communication (non-terrestrial network) services basically require a line-of-sight (LoS) path between a satellite and a user equipment device to reduce radio frequency signal fading or shadowing in order to provide reliable communication. Further, the air-interfaces of satcom (sometimes "SatCom" and other times "SATCOM") and those used for terrestrial mobile wireless (5G, LTE and the like) have significant differences, including having to comply with different standards from one another.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
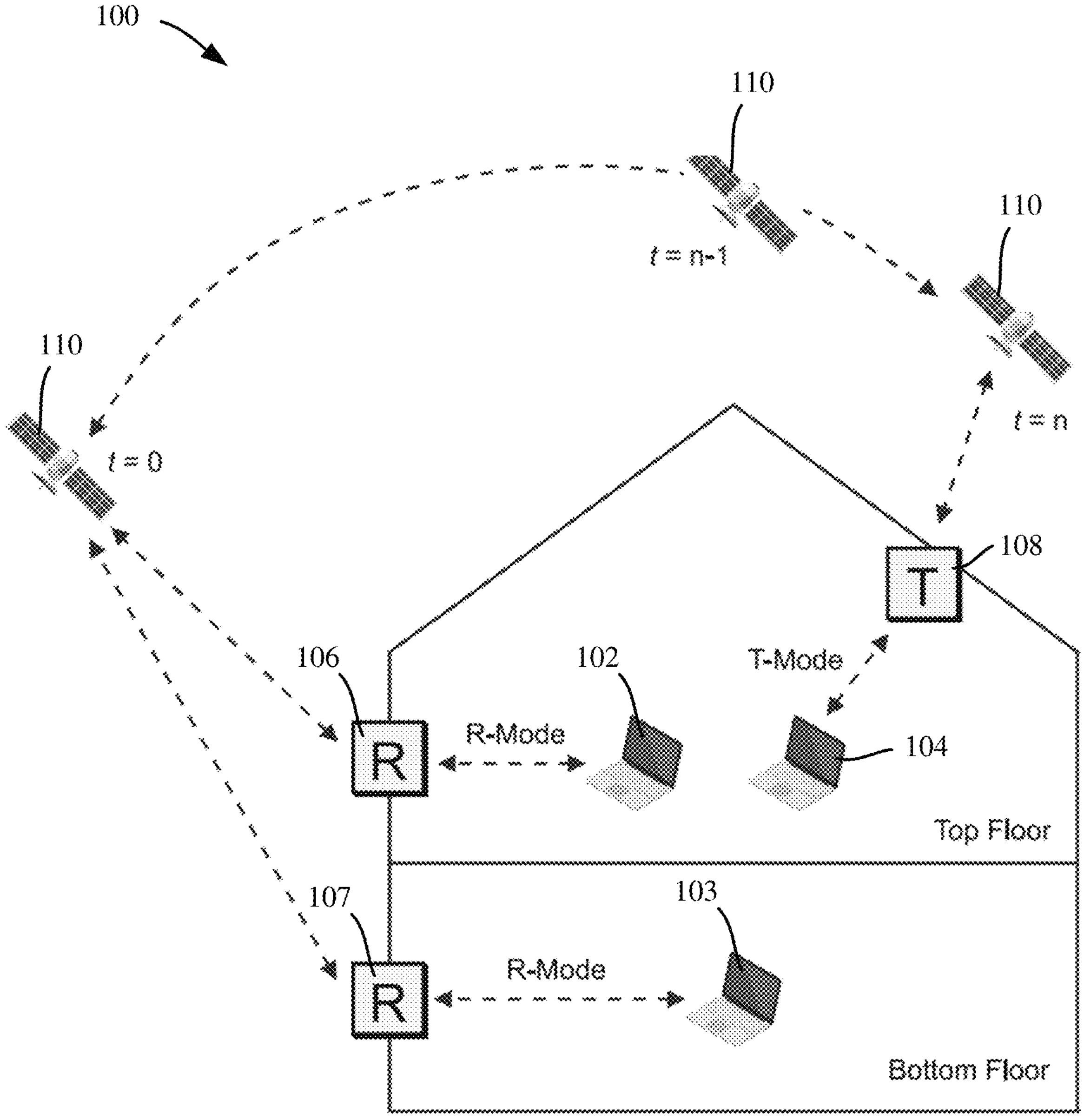
FIG. 1 is a representation of multiple example locations for deploying a metasurface (reconfigurable intelligent surface, or RIS) indoors, including metasurfaces configured to operate in a transmission mode and reflection mode, in accordance with various example embodiments and implementations of the subject disclosure.

The technology described herein is generally directed towards connecting user equipment type modems (e.g., 3GPP-compliant 4G/5G commercial off the shelf devices) to the legacy satellite satcom communication protocol, whereby user equipment (UE) are able to communicate with satellite services. Thus, for example, via the technology described herein, UEs such as notebook computers and cellphones can connect directly to satellites with no modification to the legacy satellite or to the UE. This is significant because many satellites were put into orbit many years ago, whereby changing their native air-interface is impractical, and at the same time modifying and adding features to a 3GPP-compliant modem takes on the order of years to design, test, implement and deploy.

As will be understood, based on the technology described herein, 3GPP-compliant wireless modems can communicate directly with satellites, which includes not only legacy satellites, but those recently (or not yet) deployed. To this end, a transcoder is described, where the term “transcode” and the like (“transcoding,” “transcode,” “transcoded”) refers to the two very different air-interfaces being converted from one standard to another standard. This includes Layer-1 physical (L1-PHY) packet level decoding of the downlink satellite-compliant signal, and reencoding to a downlink UE-compliant signal, and in the opposite direction, that is, L1-PHY packet level decoding of the uplink UE-compliant signal, and reencoding to an uplink satellite-compliant signal. Further described is a doppler compensation technique, in which hardware-based/physical doppler-shift compensation dynamically corrects for doppler shifting as a satellite moves across the horizon. This technique requires no modification to existing UEs.

Thus, the technology described herein transcodes the satcom industry standard air-interface to the terrestrial mobile wireless standard, and vice-versa. In addition to packet-level conversion, example protocols and resources that can convert, through the transcoding process, include, but are not limited to, doppler shifting/correction/compensation, frequency up/down conversion, modulator/demodulator, frequency equalization, negative-slope compensation, repeater, re-clocking, amplification, power levels, and the like.

Further, the integration of a metasurface, or reconfigurable intelligent surface (RIS integration) facilitates portability and disaggregation. More particularly, while the indoor radio frequency (RF) signal is converted using the transcoding technology described herein, the indoor RF signal needs to get outdoors to achieve line-of-sight (LoS) connectivity directly to the satellite. RIS technology provides the capability to transmit the indoor RF signal to the outdoor environment, that is, transmit the UE signal from indoors-to-outdoors and outdoors-to-indoors wirelessly, eliminating the need for a physical cable to connect a mounted outdoor antenna to indoor UEs. Among other benefits, a RIS also adds the benefit of portability, and different ways to deploy the transcoder device. For example, the transcoder device can be standalone box, integrated into an antenna, tether-box attached to notebook, and so on. The transcoder device and/RIS also can be disaggregated, e.g., to have some components/features in a computing device such as a notebook, and other components/features in an external RIS/antenna.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and metasurfaces in general.

Reference throughout this specification to “one embodiment,” “an embodiment,” “one implementation,” “an implementation,” etc. means that a particular feature, structure, characteristic and/or attribute described in connection with the embodiment/implementation can be included in at least one embodiment/implementation. Thus, the appearances of such a phrase “in one embodiment,” “in an implementation,” etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as “optimize,” “optimization,” “optimal,” “optimally” and the like only represent objectives to move towards a more optimal state, rather than necessarily obtaining ideal results. Similarly, “maximize” means moving towards a maximal state (e.g., up to some processing capacity limit), not necessarily achieving such a state, and so on.

It will also be understood that when an element such as a layer, region or substrate is referred to as being “on” or “over” “atop” “above” “beneath” “below” and so forth with respect to another element, it can be directly on the other element or intervening elements can also be present. In contrast, only if and when an element is referred to as being “directly on” or “directly over” another element, are there no intervening element(s) present. Note that orientation is generally relative; e.g., “on” or “over” can be flipped, and if so, can be considered unchanged, even if technically appearing to be under or below/beneath when represented in a flipped orientation. It will also be understood that when an element is referred to as being “connected” or “coupled” to another element, it can be directly connected or coupled to the other element or intervening elements can be present. In contrast, only if and when an element is referred to as being “directly connected” or “directly coupled” to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a representation of an example environment 100 including user equipment 102-104 operating indoors, and metasurfaces 106-108. As described herein, the metasurfaces 106-108 are used to offer signal boost in the 3GPP standardized non-terrestrial network frequency bands. As will be understood, a Layer-1 physical (L1-PHY) transcoder is described herein for coupling signals configured for the Satcom frequency band to signals configured for the UE (3GPP) frequency band and vice-versa; the L1-PHY transcoder can be integrated with the metasurface, or separate from the metasurface. If integrated with the metasurface, the UE side of the R-mode/T-mode (106-108) is the 3GPP frequency band, while the satellite side of the R-mode/T-mode (106-108) is the Satcom frequency band. If the L1-PHY transcoder is separate from the metasurface (the metasurface is independent), the UE side of the R-mode/T-mode (106-108) is the 3GPP frequency band, a second side of the metasurface is the 3GPP frequency band, and the satellite side of the L1-PHY transcoder is the Satcom frequency band (the UE side of the L1-PHY transcoder is 3GPP).

In general, a metasurface (sometimes referred to as a reconfigurable intelligent surface, or RIS) of unit cells is deployed between a satellite and a user equipment (UE). The metasurface can be configured to act as a passive signal gain booster to provide a reliably connected non-terrestrial network service, including in indoor UE scenarios. There is significant signal attenuation experienced by non-terrestrial network services with respect to penetrating indoor environments. Such variability in attenuation, influenced by construction materials and their moisture content, impedes the reliability and performance of direct-to-device connections. This attenuation can range from minimal to severe, ranging from 3 dB (50%) to virtually complete attenuation; for example, metal roofing and attics equipped with radiant barriers present the most challenging conditions, exhibiting signal losses up to 30 dB (99.9% reduction).

To counteract such signal attenuation challenges, the integration of metasurface technology as described herein facilitates non-terrestrial network direct-to-everything service reliability, by using a (for example portable) designed metasurface to boost the attenuated RF signals to and from a satellite, to ensure an end-to-end link supporting always-on connectivity. In general, metasurfaces are surfaces engineered to manipulate electromagnetic waves, offering a pathway to enhance signal strength in either reflection or transmission modes. A metasurface such as described herein can be designed in a way that reduces the fabrication costs exponentially relative to other technologies, as in general a metasurface only needs a single layer of metallization on a substrate. The metasurface can be used for direct-to-everything (DTX) communications, including with smartphones, laptops, automotive vehicles, IoT devices, or inter-device communication, as long as the operating RF frequency is within the gain band of specially designed metasurface.

One implementation of the technology described herein includes a passive (no power needed) metasurface that can be reconfigured into reflection mode or transmission mode by simply attaching or removing a metallic backplane to or from the metasurface. More particularly, a passive metasurface signal booster does not require power to function, and the reconfiguration to the reflection mode can be achieved by attaching a metallic back plane panel to the underside of the metasurface, or removing the back plane to achieve transmission mode. These designs add additional benefits to ensure non-terrestrial network connectivity even during a power outage, which is significant for the safety and emergency response community.

In one implementation, the metasurface can be sufficiently small in size so as to be portable, which can be carried when traveling or moved within a building as needed to enhance the signal strength with respect to non-terrestrial network uplink and downlink communications. The portability of the metasurface allows a user to test out multiple candidate positions, using either a transmission mode or a reflection mode of the metasurface within the targeted indoor environment. In this way, the user knows ahead of time that the non-terrestrial network service is not limited to a single spot. This significantly increases the convenience for the user; for example, in a scenario where the roofing material of a target building only has a few dB of attenuation at non-terrestrial network service link frequency, the metasurface booster gain operating in the transmission mode is adequate to compensate for that small loss. This removes the line-of-sight requirement between the user equipment and the satellite field of view. In general, a user can sit anywhere in a room with boosted non-terrestrial network signal through the transmission mode of a suitably placed portable metasurface, which further enhance the flexibility of the non-terrestrial network service.

In general, a satellite is always in the (low attenuation) field-of-view of a metasurface with respect to the non-terrestrial network (NTN) frequency bands; before one NTN communications satellite travels out of the field of view, another one moves in. Although only a single satellite 110 is depicted in FIG. 1 (at different times t=0, t=n−1 and 1=n), it is understood that at least one satellite is always within the field of view of any of the metasurfaces 106-108.

In FIG. 1, the two reflecting mode ("R") metasurfaces 106 and 107 and one transmission mode ("T") metasurface 108 provide satellite communication signals to and from user equipment, e.g., laptop or notebook computers 102-104. Note that instead of multiple UE computers 102-104, a single computer can be moved among the various coverage locations of the metasurfaces 106-108.

Figure 2A:
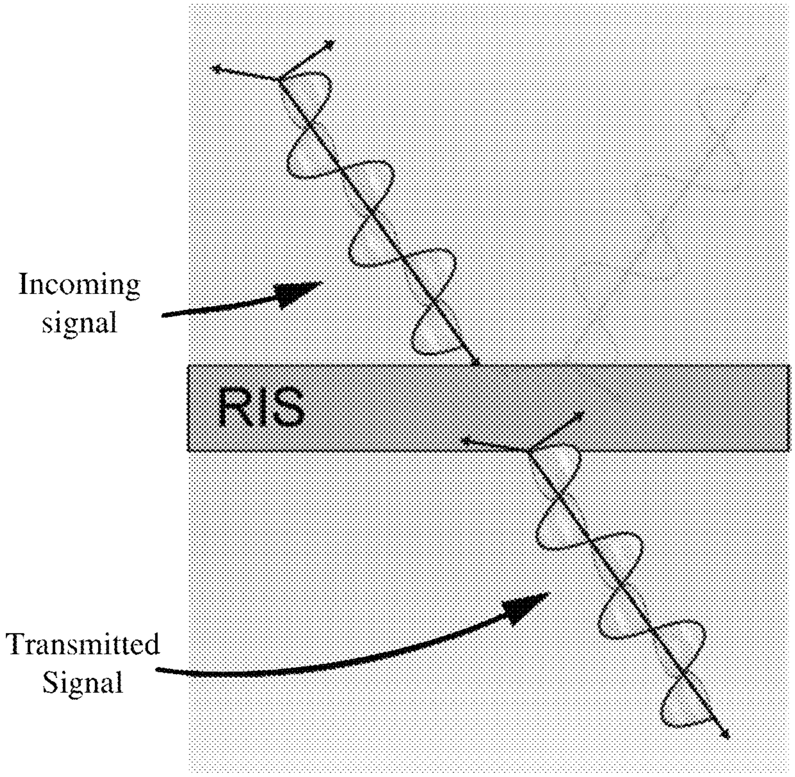
FIGS. 2A and 2B are representations of example metasurfaces configured to operate in a transmission mode and reflection mode, respectively, in accordance with various example embodiments and implementations of the subject disclosure.
Figure 2B:
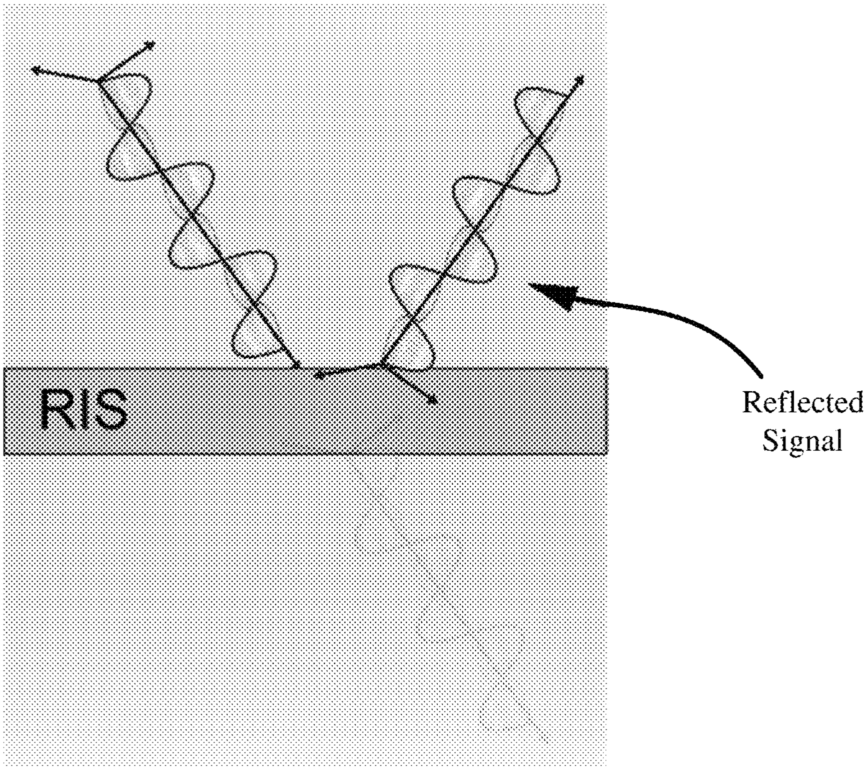

FIGS. 2A and 2B illustrate how an electromagnetic (EM) wave can be redirected by a reflective intelligent surface (RIS), through transmission or reflection, that is, FIGS. 2A and 2B show the concept of a metasurface (reconfigurable intelligent surface, or RIS) in transmission and reflection modes, respectively. As can be seen, in the transmission mode of FIG. 2A, the RIS is basically transparent to the incoming signal, and as described herein (and not explicitly shown in FIG. 2A), respective unit cells of the RIS can be designed with different phase shifts so as to passively refract respective portions of the incoming signals and thereby boost the incoming signal via constructive interference (gain array) of the different refracted respective portions of the incoming waves as refracted by the respective unit cells. Similarly, in the reflection mode of FIG. 2B, the RIS basically reflects a very large percentage of the incoming signal, and as described herein, the respective unit cells of the RIS can be designed with different respective phase shifts so as to passively reflect respective portions and boost via gain array the incoming signal via constructive interference of the different reflected respective portions of the incoming waves as reflected by the respective unit cells.

As set forth herein, the range of signal attenuation (e.g., in dB/inch) is different for various commonly used building materials such as plywood, clear glass, cinder block, drywall, and ceiling tile; each material's attenuation properties change with frequency. These building materials have lower attenuation (non-negligible) at lower frequencies, however as expected, the attenuation increases as the frequency rises, which indicates that higher frequencies face greater attenuation, which is a challenge for direct-to-device services that operate at these frequencies. However, the metasurfaces 106-108 in FIG. 1 are positioned to mitigate the attenuation issue, e.g., the two reflecting mode ("R") metasurfaces 102 and 103 can be placed by windows or behind other low-attenuation materials, while the transmitting mode metasurface 104 can be placed near the ceiling or in line with a skylight so as to have a reasonable line-of-sight connection (i.e., low attenuation conditions) with any position of any satellite in each metasurface's field of view.

Turing to satellites in general, satellite communications (satcom) have long been commercialized to provide mobile (aviation, sea, railroad), fixed (isolated rural area), and broadcast services for decades, while the terrestrial network has gone through 2G, 3G, 4G and 5G evolutions. With 3GPP now adding non-terrestrial networks (NTN) in the standards definition of 5G, satellite direct-to-device is likely to be used with smartphones, sensors, laptops and connected vehicles, wherever stable connectivity can be assured between such user equipment and a satellite. Indeed, 3GPP NR-non-terrestrial network standards enable non-terrestrial network direct-to-everything services, by defining a high-level architecture that is compatible with most mobile handsets and internet-of-things (IoT) devices, as well as defining the operating bands in FR1 for UE to transmit and receive data with a satellite. The following table shows the satellite operating bands in FR1 as defined by 3GPP Release 17:

| Satellite operating band | Uplink (UL) operating band SAN receive/UE transmit $F_{UL,\ low}$-$F_{UL,\ high}$ | Downlink (DL) operating band SAN transmit/UE receive $F_{DL,\ low}$-$F_{DL,\ high}$ | Duplex mode |
|---|---|---|---|
| n255 | 1626.5 MHz-1660.5 MHz | 1525 MHz-1559 MHz | FDD |
| n256 | 1980 MHz-2010 MHz | 2170 MHz-2200 MHz | FDD |

Note that 3GPP is currently considering new radio (NR)-non-terrestrial networks above 10 GHz in the FR2 band. The Ka-band is the highest-priority band with uplinks between 17.7 and 20.2 GHz and downlinks between 27.5 and 30 GHz, based on ITU (International Telecommunication Union) information regarding satellite communications frequency use. It is expected that FR2 band will be standardized in the future 3GPP releases.

Figure 3:
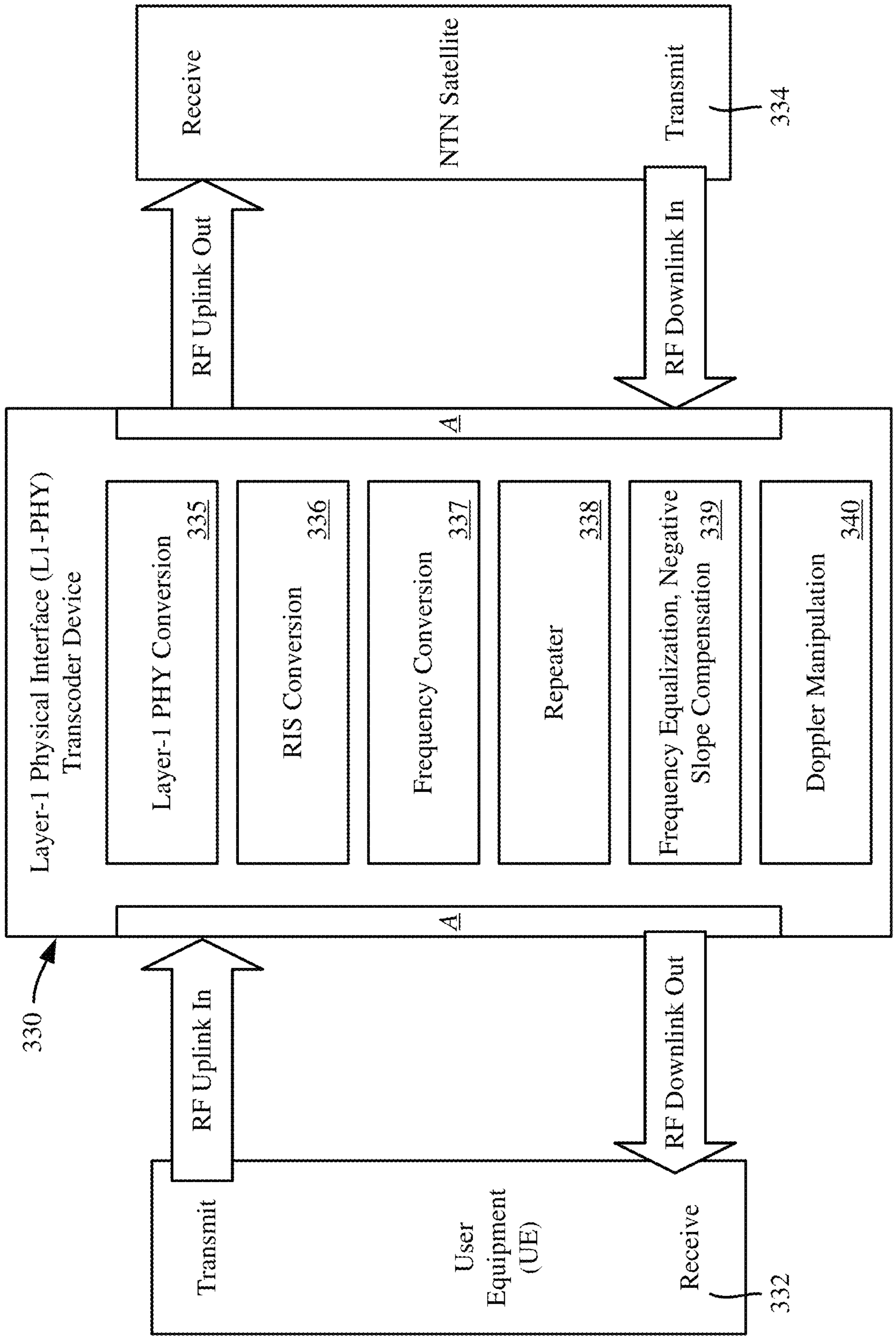
FIG. 3 is a block diagram showing an example hardware-based transcoder device in which radio frequency (RF) downlink and uplink signals are connected for RF input and output, in accordance with various example embodiments and implementations of the subject disclosure.

In one or more example implementations, as shown in FIG. 3, described herein is a transcoder device 330 (e.g., in the structure of a "box") that couples a user equipment 332 to a non-terrestrial network (NTN) satellite 334 with respect to RF uplink signals from the user equipment 332 to the satellite 334, and RF downlink signals from the satellite 334 to the user equipment 332. Various types of user equipment can include, but are not limited to, personal (e.g., notebook/laptop) computers, other computing devices, cellphones, wireless-tether-boxes, fixed wireless access (FWA)-boxes, and IoT/NB-IoT (internet of things/narrowband-internet of things) devices.

As shown in FIG. 3, a number of hardware and/or software-based modules/components 335-340 perform various functions related to the transcoding of RF input to RF output, in both uplink and downlink directions, according to the input protocols, formatting, and so forth, in the appropriate output format for the receiving entity. While these modules as described herein are shown separated in one example implementation, this is only one non-limiting example, and the various functionality performed thereby can be divided among more modules, and/or at least some of the example modules can be combined together to perform the transcoding-related functionality as described herein.

Figure 4:
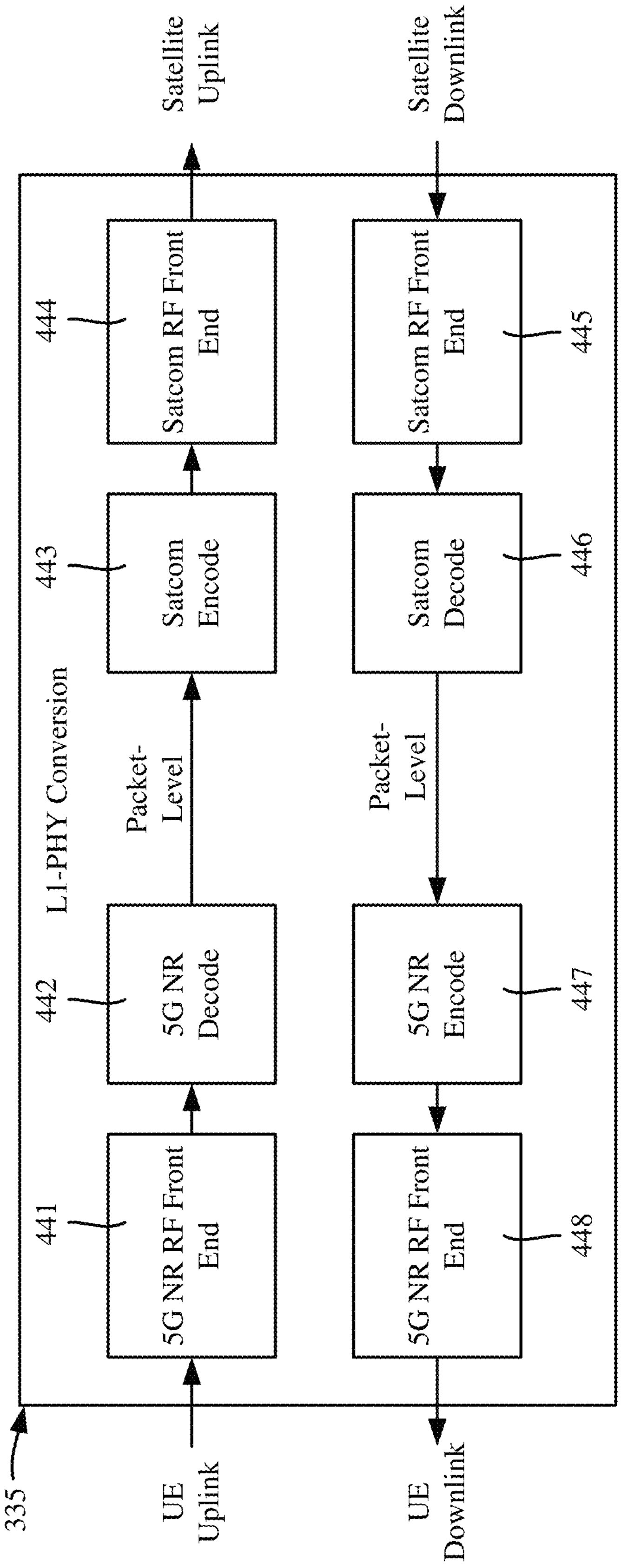
FIG. 4 is a block diagram showing an example layer-1 physical conversion module/component of a transcoder device, in accordance with various example embodiments and implementations of the subject disclosure.

In the example of FIG. 3, a layer-1 physical interface (L1-PHY) transcoder conversion module 335 performs L1-PHY gate-level packet-level conversion. As shown in more detail in FIG. 4, L1-PHY gate-level packet-level conversion is performed in the UE uplink direction, from the RF front-end control interface (RFFE) 441/(e.g., 5G NR) decode (block 442), to the packet-level satcom encoded (block 443)/RFFE 444 satellite uplink. In the satellite downlink direction, the L1-PHY transcoder conversion module 335 performs packet-level satcom-to-RFFE 445 decode operations (block 446) to 5G NR encoded (block 447)/RFFE 448 user equipment downlink packets. One or more antennas A couple the transcoder device 330 to the user equipment 334 and the NTN satellite 334, which may be via a metasurface (also referred to as a reconfigurable intelligent surface, or RIS) as described herein.

More particularly, in the uplink direction from the UE, the L1-PHY conversion module 335 of the transcoder device 330 decodes (block 442) the 5G NR terrestrial air-interface down to the native digital packet-level. Then the L1-PHY conversion module 335 reencodes (block 443) the packets into the legacy satcom air-interface protocol. The downlink direction is the inverse, that is, the L1-PHY conversion module 335 decodes (block 446) the satcom protocol to the packet-level, then reencodes (block 447) to the 5G NR air-interface protocol.

With respect to 5G decoding and reencoding, note that the 3GPP-compliant 5G NR Layer-1 physical interface logic block diagram is published. The following summarizes some features of 5G NR direct-to-device (D2D) operations and concepts with respect to NTN satellites:

NTN Mode = 3GPP Transparent-Mode
L1-Physical Interface = 3GPP-compliant Layer-1 PHY logic blocks
Bands = mobile network operator (MNO) terrestrial frequency bands
Service-Link = direct-to-device mode (mobile wireless) air-interface
Feeder-Link = repeated, amplified, frequency-converted to NTN Gateway frequency-band air interface
Antenna Technology = varies, depends on FR1/FR2/NTN bands
Physical Constraints = mobile wireless operation, physical challenges
Interference, Weather, Scintillation, Channel Modeling, Link-Budget Analysis = mobile wireless operation, various challenges -continued

| |
|---|
| Use-Case/Market/Protocol = IoT, NB-IOT, RedCap, 5G NR |
| Packet-Format/Tunneled-Packet = 3GPP GTP-Tunnel, IP, UDP, etc. |

For the air interface, note that satcom (Digital Video Broadcasting (DVB)-Compliant L1-PHY details are published, including a logic block diagram of a DVB-compliant DVB-S2 Layer-1 Physical Interface (L1-PHY). The logic blocks used on the L1-PHY portion of the satcom can be specific to the DVB-standardized satcom protocol; the DVB standards are global standards that have defined the satcom protocol for many years, and many deployed legacy satellites support the early DVB-S standards. Over the years the DVB consortium has moved from the original DVB-S to DVB-S2 to DVB-S2 to the latest DVB-S2X. The following summarizes some features of satcom operation:

| |
|---|
| NTN Mode = satcom, legacy DVB standards |
| L1-Physical Interface = satcom DVB protocol L1-PHY logic blocks |
| Bands = satcom satellite frequency bands, K, Ku, Ka, Q/V, S, L |
| Service-Link = satcom air-interface |
| Feeder-Link = satcom air-interface |
| Antenna Technology = varied, depends on K, Ku, Ka, Q/V, S, L bands |
| Physical Constraints = mobile and static wireless operation, physical challenges |
| Interference, Weather, Scintillation, Channel Modeling, Link-Budget = mobile and static wireless operation, various challenges |
| Use-Case/Market/Protocol = satcom L1-PHY, satellite broadband providers, military, governments |
| Packet-Format/Tunneled-Packet = satcom, varied packet formats through the years. |

A comparison of 5G NR and satcom air-interfaces is shown in the table below summarizing the above features used by the 3GPP terrestrial mobile wireless industry and the satcom satellite industry. The frequency bands are different from one another, and the frequencies are approved through two different standards organizations, 3GPP and DVB. Some satcom bands have been used for satellite communication for over twenty years, while 3GPP 5G NR bands were allocated around approximately 2015.

| | satcom | 3GPP 5G NR D2D |
|---|---|---|
| L1-PHY | DVB-S/S2/S2X | 3GPP 5G NR L1 PHY |
| Air Interface | satcom DVB-S/S2/S2X | 3GPP Rel19 5G NR |
| Freq Bands | Bands K, Ku, Ka, Q, V, S, L (WRC allocated) | FR1/FR2/NTN MNO bands approved by 3GPP and WRC |
| Market | Mobile wireless, VSAT Broadband, fixed-satellite serves (FSS), IoT/NB-IOT | Direct-to-Device (D2D), UE talks directly to satellite, IoT/NB-IOT, RedCap, FWA Broadband |
| Use Case | Broadband, disaster-relief, emergency comms, | Personal cell, notebook, any UE |
| Users | VSAT, govt, military, broadband customers, | Mobile wireless subscribers/Mobile Network Operator (MNO) |
| Satellite Era (legacy/new) | Legacy and new satellites | NA |
| Constellations | STARLINK, KUIPER, ONEWEB, DISH/HUGHES/ECHOSTAR, SDA, GLOBALSTAR, IRIDIUM, AST, ATT, TELESAT, etc. | NA (limited support for 3GPP transparent-mode, no support for regenerative-mode) |
| Terrestrial Network | NA | 5G NR |

As described herein, the transcoder device 330 can be integrated with reconfigurable intelligent surface (RIS) technology to relay the satellite downlink signal into the indoor environment, and vice-versa to relay the indoor UE signal-to-satellite uplink. This removes the constraints of line-of-sight (LoS) between the UE and satellite.

Returning to FIG. 3, metasurface or RIS conversion, represented by block 336, is included for both the UE-side and the satellite-side. A metasurface, or RIS can be used to convert the downlink signal received from the satellite 334 for redirection to the UE 332 by including a frequency converter in between and boosting the signal amplitude, which can be, at least in part, by passive array gain. The metasurface can be similarly used with the uplink signal received from the UE 332 for redirection to the satellite 334. This conversion is not limited to amplitude, but can also include phase change, signal leveling, distortion compensation, up conversion, down conversion, and/or the like, by integrating radio frequency integrated circuit (RFIC) circuitry with the RIS conversion 336 functionality.

With respect to satellite and user equipment frequencies, terrestrial and non-terrestrial networks use different frequency bands, without any sharing therebetween, resulting in issues in the merging of terrestrial and non-terrestrial networks when it comes to frequency bands and air-interfaces. One challenge is that, when using mobile network operator frequency bands or satellite (satcom) frequency bands, there are significant band-rights regulation issues.

The following table shows some satcom and terrestrial frequency bands:

| | Service-Link | |
|---|---|---|
| Frequency Bands | Uplink | Downlink |
| Terrestrial (5G NR) Bands - Mobile Network Operator (MNO) | FR1 (Sub-6 GHz)<br>FR2 (mmWave) | FR1 (Sub-6 GHz)<br>FR2 (mmWave) |
| Satcom Bands | L-Band<br>S-Band<br>Ku-Band<br>K-Band<br>Ka-Band<br>Q/V -Bands | L-Band<br>S-Band<br>Ku-Band<br>K-Band<br>Ka-Band<br>Q/V -Bands |

Frequency conversion is thus needed for the transcoding, and as described herein block 337 represents converting between the 3GPP air-interface and the satcom air-interface frequencies. As is understood, this includes mobile network operators (e.g., 5G)-to-satcom frequency (band) conversion, and satcom-to-mobile network operator frequency (band)

conversion. In general, frequency conversion at satellite frequencies is well understood and not described in detail herein, except to reiterate that the frequency conversion of block 337 includes satcom-to-5G and 5G-to-satcom frequency conversion.

A repeater (block 338) can perform other functions, such as including, but not limited to, re-clocking, amplification, and power level adjustment, and can be based on a generic transponder/frequency converter, where in general, a transponder is a broadband RF channel used to amplify one or more carriers on the downlink side of a geostationary communications satellite. A transponder is simply a repeater that takes in the signal from the uplink at one frequency, amplifies the signal and sends it back on another frequency. Satellites can have bent-pipe repeaters, which receive signals in the uplink beam, block translates them to the downlink band, and separates them into individual transponders of a fixed bandwidth. A transponder can be amplified by a traveling wave tube amplifier (TWTA) or a solid state power amplifier (SSPA).

Frequency equalization and negative-slope compensation are incorporated into block 339 of FIG. 3. One of the features of the transcoder device 330 is to equalize the frequency and create a negative image of the loss generated from the conversion, and superimpose it into an equalizer to maintain constant loss over the band. A negative slope compensation technique can be a purely passive resistor network-based technique that can be implemented in the RF chain; the equalization can be hardware-based, software-based, or a combination of both.

Another module/component shown in FIG. 3 is directed towards doppler shifting/correction/compensation, wherein the Doppler effect (also known as Doppler shift) is the change in the frequency of a wave from the perspective of an observer when the source of the wave and the observer are moving relative to one other. Doppler manipulation (block 340) compensates for the movement as the satellite flies overhead. To this end, the doppler manipulation 340 adjusts based on tracking the changing x-y-z dimensions of the satellite. In this way, for example, the L1-PHY transcoder device 330 can deliver hardware-based doppler-modification data to allow commercially available 5G NR modems (UEs) to communicate better with satcom satellites without any UE modifications.

FIGS. 5A, 5B, 6A and 6B shows some example, nonlimiting physical form factors suitable for the transcoder device 330, in which the terrestrial to non-terrestrial transcoder device 330 is implemented as a hardware product with software code running on the hardware. The internal transcoder includes printed circuit boards (PCBs), silicon chipsets, antennas, and RF components, which in general, are intended to meet a very low-cost market, including that the enclosures, PCBs, and other physical components can be commercially available, off-the-shelf components.

Figure 5A:
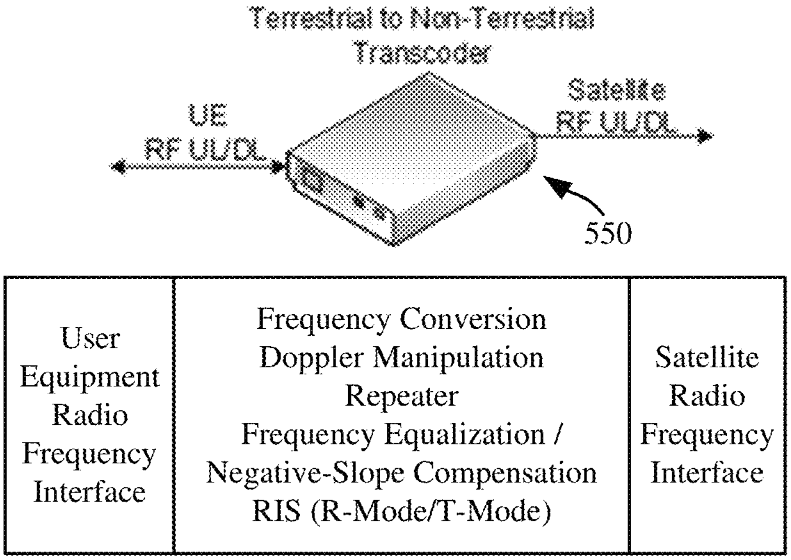
FIGS. 5A and 5B are examples of hardware-based transcoder devices for coupling a user equipment to a satellite, including via a metasurface (RIS, FIG. 5B), in accordance with various example embodiments and implementations of the subject disclosure.
Figure 5B:
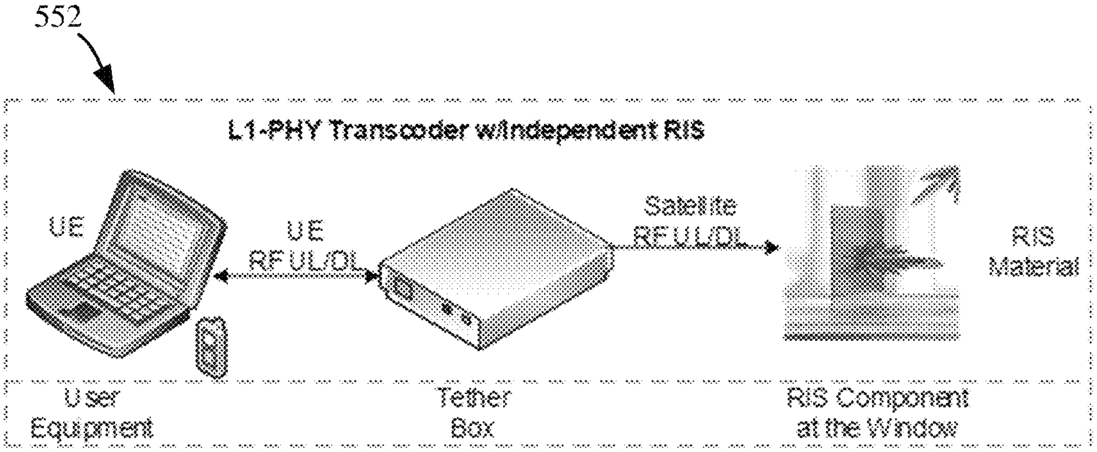

For example, FIG. 5A shows a standalone box configuration 550, which, as shown via block 552 of FIG. 5B, can be RF coupled (e.g., tethered) to a metasurface (an independent RIS) with respect to signal redirection from and to a satellite, and/or from and to user equipment. An advantage of this form factor is that more than one RIS/RIS component can connect to the L1-PHY transcoder box 552, providing more coverage. Note that a standalone box configuration 550 can be implemented in a very small aperture terminal (VSAT)-type system.

Figure 6A:
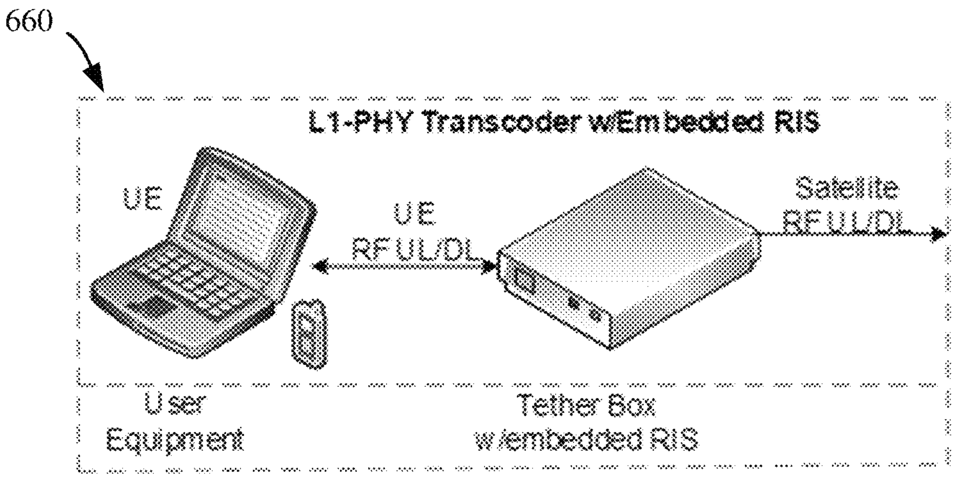
FIGS. 6A and 6B are alternative examples of hardware-based transcoder devices for coupling a user equipment to a satellite, including via one or more metasurfaces (FIG. 6B), in accordance with various example embodiments and implementations of the subject disclosure.
Figure 6B:
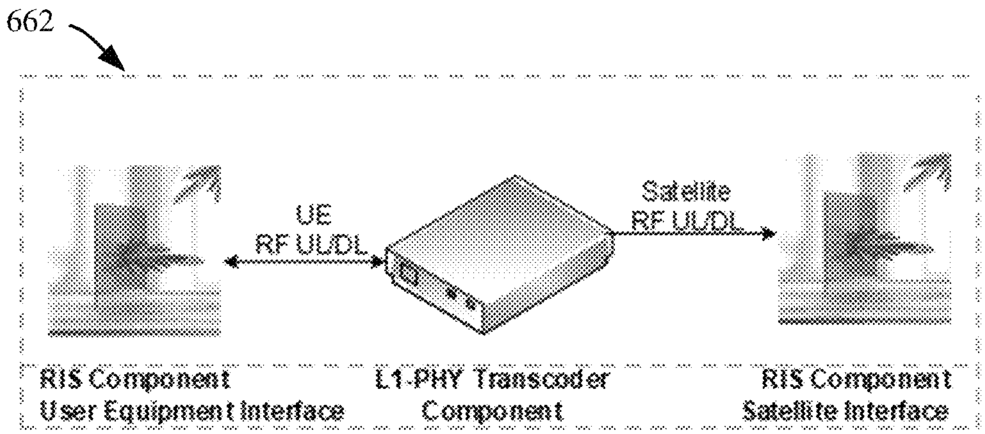

FIG. 6A shows a tether-box transcoder in block 660 with an embedded RIS coupled to a UE; it is understood that the transcoder circuitry can likewise be embedded into RIS circuitry. FIG. 6B shows an L1-PHY transcoder with RIS coupling to both a UE and a satellite. As with FIG. 5A, an advantage of this form factor is that multiple RIS components can connect to the L1-PHY transcoder box, providing more coverage for both the UE-side and satellite-side.

Note that the RIS of FIG. 6B can be designed as two independent metasurfaces, one designed for a UE frequency band, and one designed for a satellite frequency band. Alternatively, a single RIS can be designed for two (or more) different frequency bands, e.g., with different sections of the metasurface designed for redirecting the different frequency bands. Thus, although depicted as separate RIS components in FIG. 6B, there can be a single RIS component for both the UE and the satellite interfaces. For example, a user can mount a single RIS at a window location, with the RIS used to redirect signals from the satellite section of the RIS to the transcoder box, and from there to the UE, as well as from the UE (via the UE section of the RIS) to the transcoder box, and then back to the satellite section of the RIS, such as when the UE is using a millimeter-wave frequency or the like that is blocked from communicating directly (is non-LoS) with the transcoder box.

Turning to addition details of the metasurface (RIS), in one or more example implementations, described herein is a passive portable metasurface that can be manually configured to operate either in reflection mode (R-Mode) or in transmission mode (T-mode) to service various device(s)/UE(s), e.g., as shown in FIG. 1. The portable metasurfaces can be designed in a way to offer signal boost in the 3GPP standardized non-terrestrial network bands without requiring any power source, providing indoor usage scenarios as well as a travel-ready solution for remote areas, and/or during emergency situations when power is not available.

Figure 7:
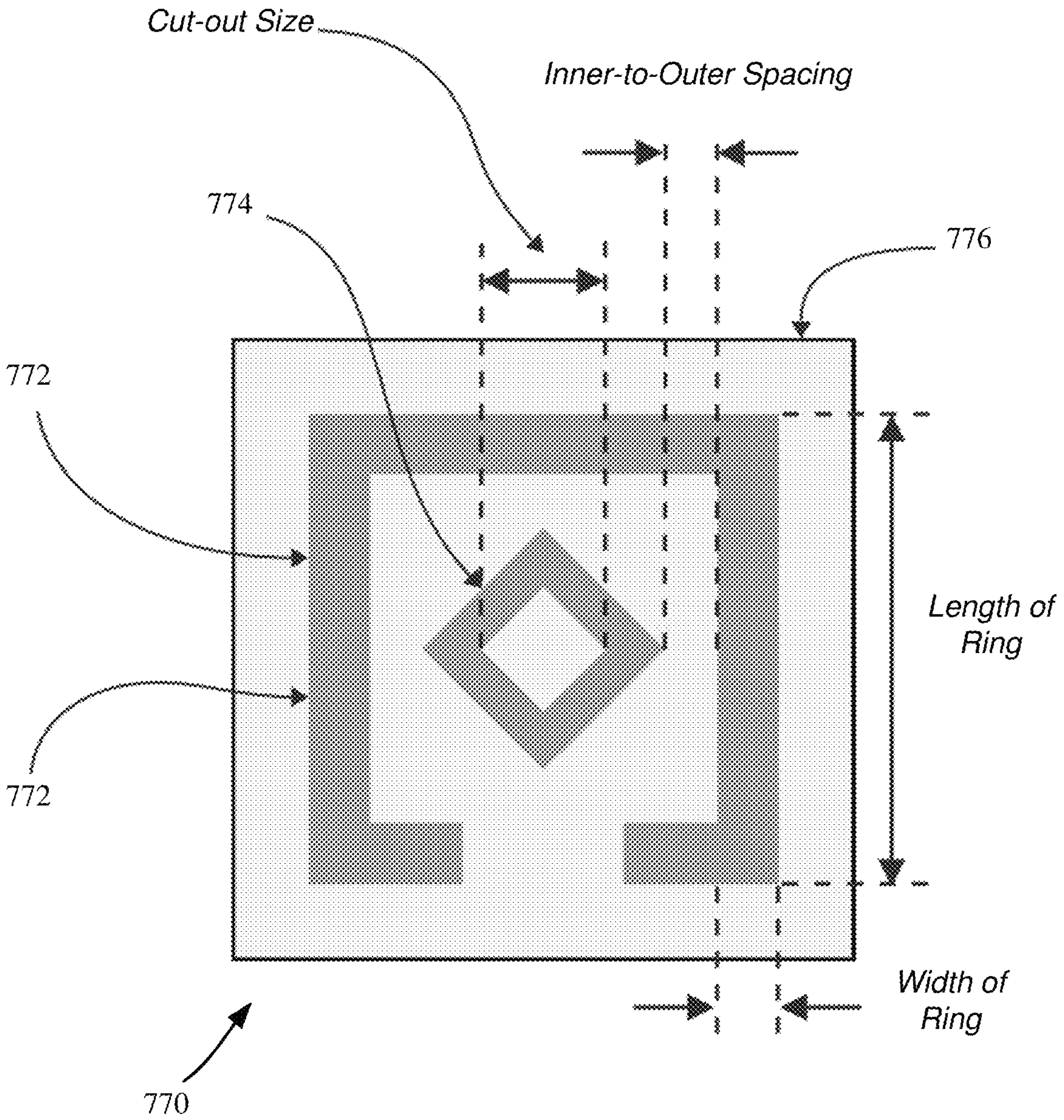
FIG. 7 is an example top view representation of an example unit-cell suitable for use in a metasurface that operates in a transmission mode or a reflection mode, in accordance with various example embodiments and implementations of the subject disclosure.

FIG. 7 shows one example design of a unit cell 770 of a metasurface. In this example, the unit cell 770 has a metallic resonating pattern shaped as square split ring (outer shape 772) with a central rhombus (inner shape 774). The pattern is formed from a thin metal film on a dielectric substrate 776. The dimensions of the unit cell 770 determine the frequency at which the unit cell resonates, and are thus sized based on the frequency band of the incoming signal, e.g., the n255 or n256 satellite bands. Smaller dimensions can be used for higher frequencies, such as millimeter wave/FR2 frequencies. Note that FIG. 3 is only one non-limiting example, and that the metallic resonator pattern of a unit cell can be of any shape and size as long as the metallic resonator pattern resonates at the desired frequency.

Scaling of the rhombus shape, or by rotating the inner shape 774, allows the phase of the unit-cell to be tweaked; in this way, a metasurface's unit cells can be coded as per the phase-codebook of the metasurfaces for beam redirection, given an incoming signal from a known general direction relative to the metasurface, e.g., from the sky for a satellite. Various design dimensions are shown in FIG. 3 to better illustrate the optimization variables. This shape of the unit-cell can be developed on any choice of commonly available dielectrics including but not limited to FR4 laminates, Rogers RF substrates, alumina, sapphire, glass, ceramics, or other non-metallic substrates, as long as the unit-cell shows a resonance peak at the desired frequency.

Figure 8:
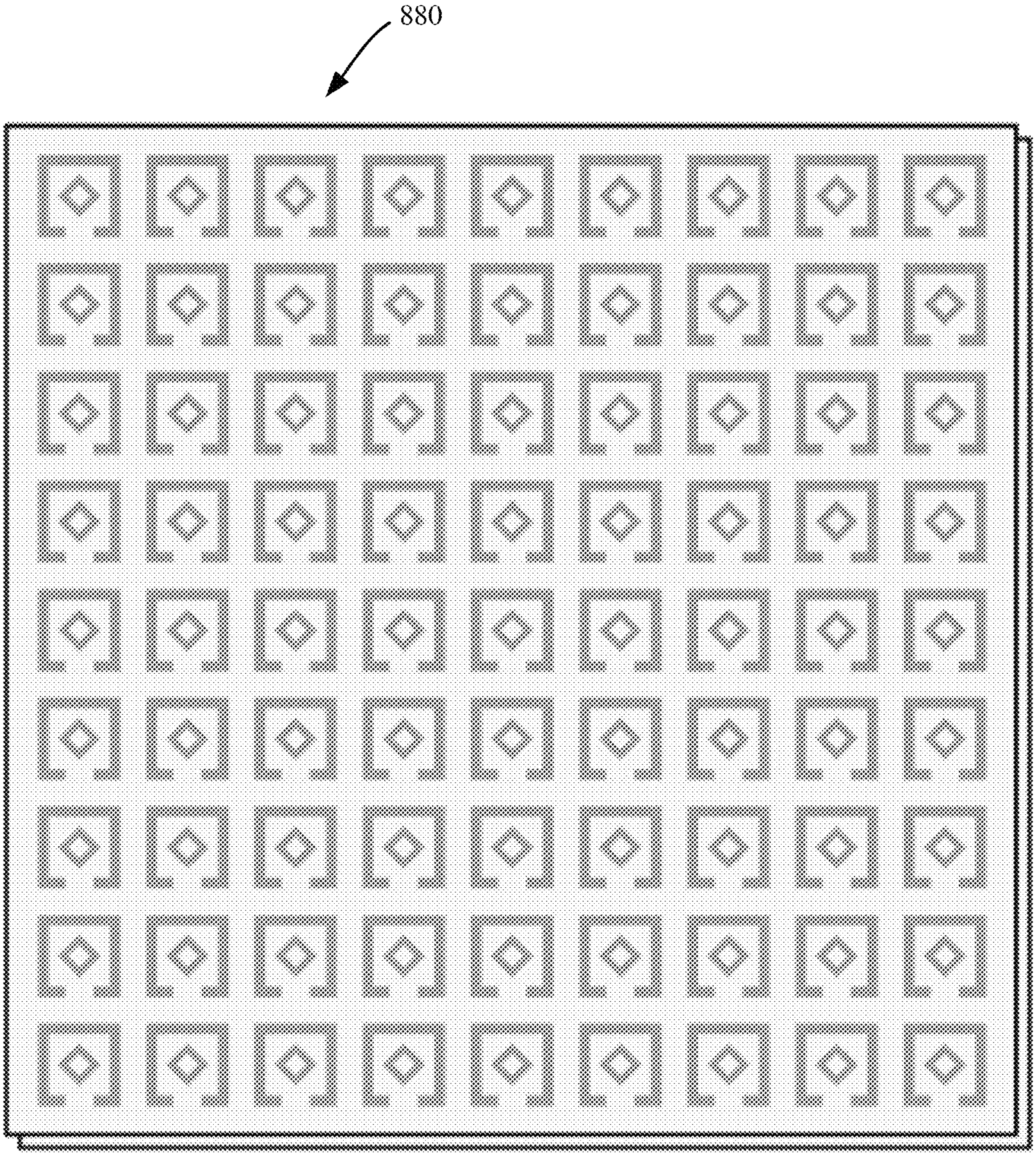
FIG. 8 is an example top view representation of an example metasurface panel that can be configured to operate in a transmission mode or a reflection mode, in accordance with various example embodiments and implementations of the subject disclosure.
Figure 9:
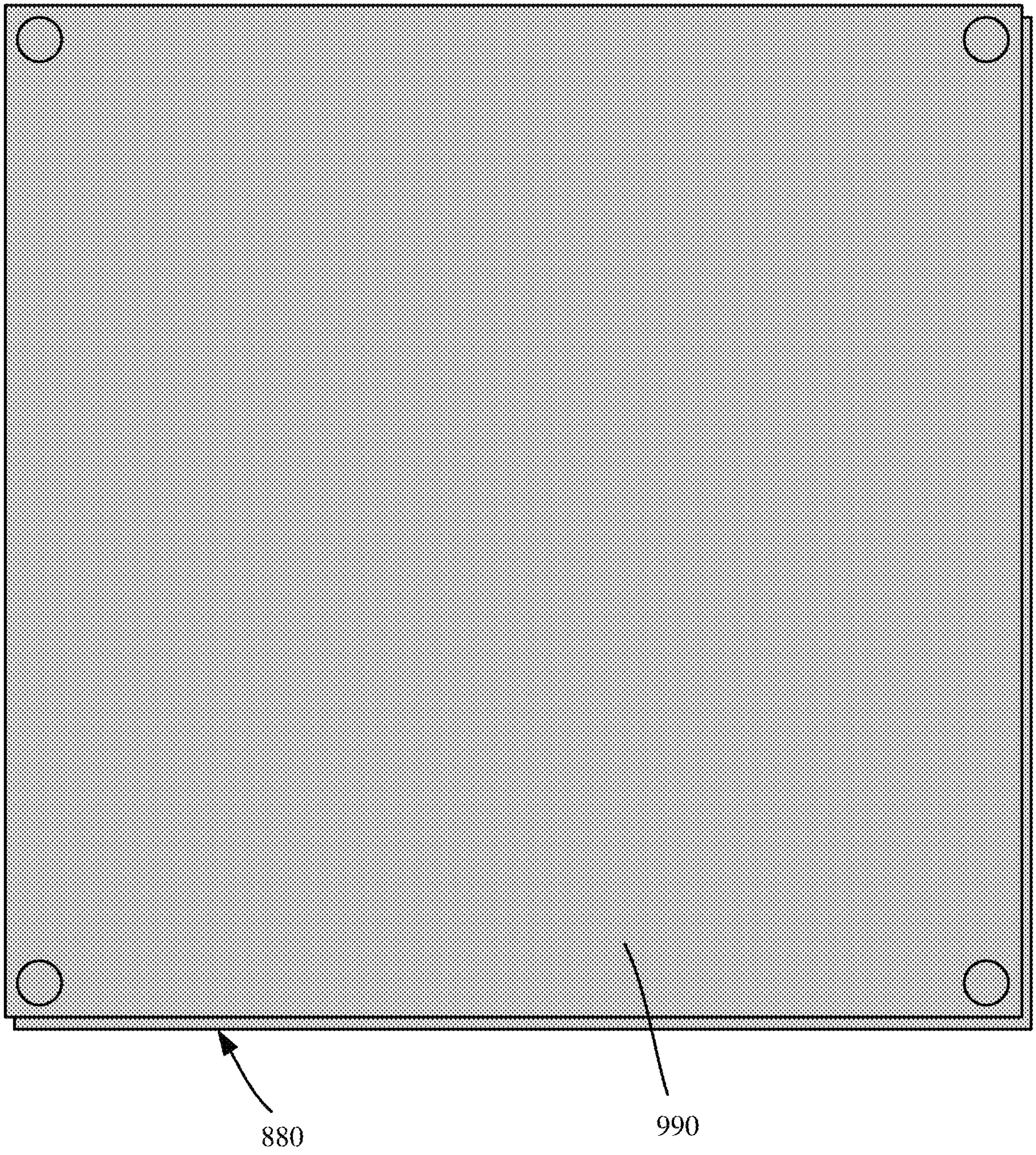
FIG. 9 is an example bottom view representation of the example metasurface panel of FIG. 4, with a metallic backplane attached to operate the metasurface in a reflection mode, in accordance with various example embodiments and implementations of the subject disclosure.
Figure 10:
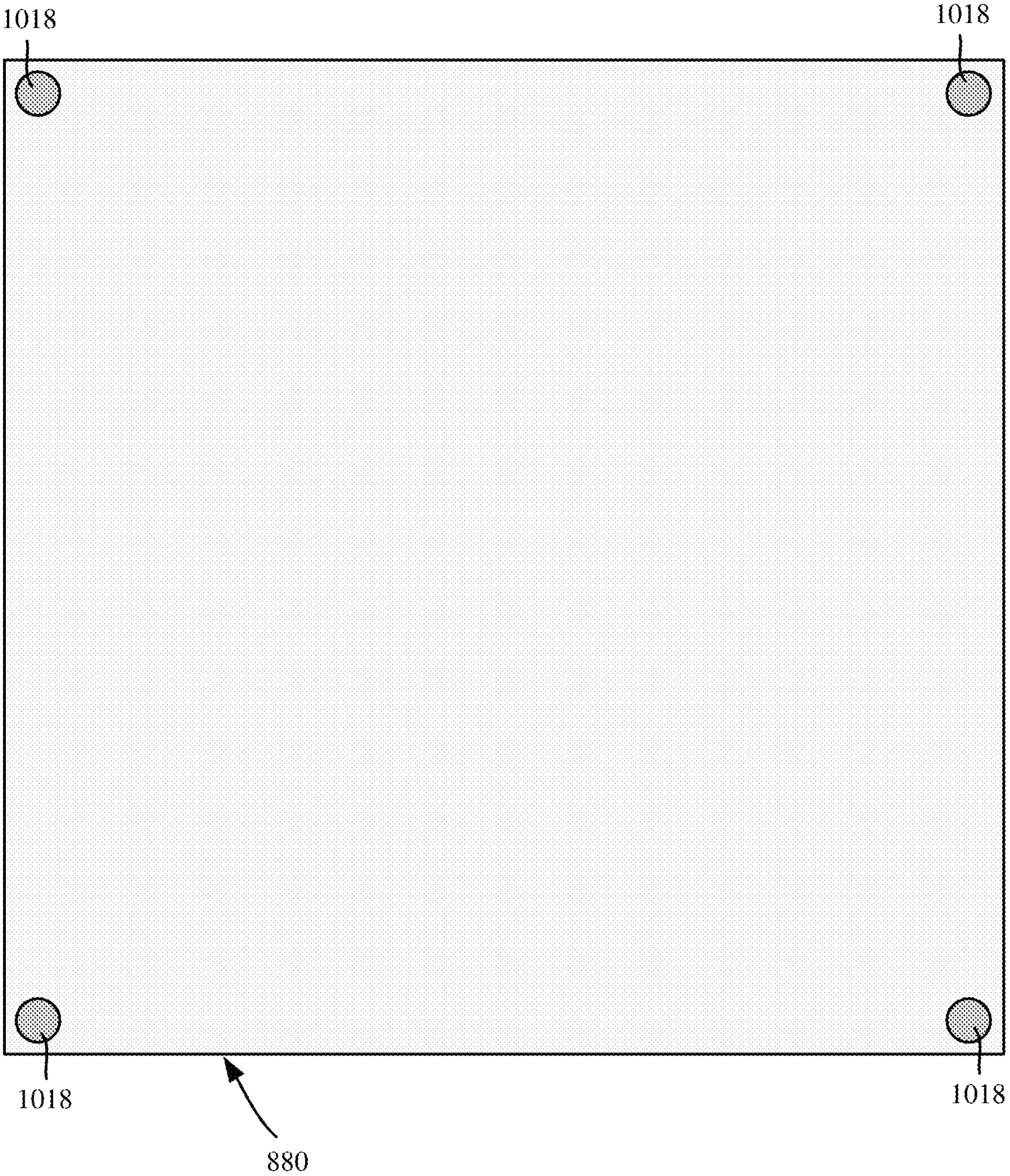
FIG. 10 is an example bottom view representation of the example metasurface panel of FIG. 4, with the metallic backplane removed to operate the metasurface in a transmission mode, in accordance with various example embodiments and implementations of the subject disclosure.

FIGS. 8-10 show the concept of a metasurface 880 of unit cells (top view, FIG. 8) highlighting the manually attachable metal backing plane 990 for reflection mode (R-mode) when attached (FIG. 9). Without the metal backing, that is, when the metal backplane is detached, the panel works in default transmission mode (T-mode), as represented in FIG. 10.

Thus, in one implementation, a complete panel (which can be portable) includes two physical sections; one section is the array of metasurface unit cells (FIG. 8) patterned on a metal layer formed on the dielectric substrate, while the second is a solid metal sheet that functions as a back plane. When the metal panel 990 is attached to the back of the metasurface array as in FIG. 9, the metasurface 880 inherently operates in the reflection mode, bouncing the enhanced signals back in the reflecting direction, allowing signals to be reflected from the panel with improved signal strength due to array gain from constructive interference, resulting from different configured phase shifts of the unit cells. When the metasurface is used without the back plane as in FIG. 10, it operates in a transmission mode, allowing signals to pass through the panel with improved signal strength due to array gain from constructive interference.

In one design implementation, a magnetic attachment system (e.g., with magnets 1018 for aligning and attached the metal back plane for the R-mode) is used to couple the back plane 990 to the underside of the unit cell surface, which simplifies the alignment when transitioning between transmissive and reflective operating modes. By simply placing or removing the back plane, a user can switch the metasurface between its two modes of operation, making the system highly adaptable for different communication scenarios.

It should be noted that while such an inexpensive back plane option allows straightforward reconfiguration of the operating modes of a metasurface, this is a non-limiting example. For example, one user may want a ceiling-mounted metasurface for operating only in the transmission mode, and can thus purchase one without a back plane. In contrast, a different user may want a window-mounted backplane for operating only in the reflection mode, and can purchase a metasurface with a fixed (non-detachable) back plane for presumably less cost than a metasurface with a selectively detachable back plane.

Figure 11:
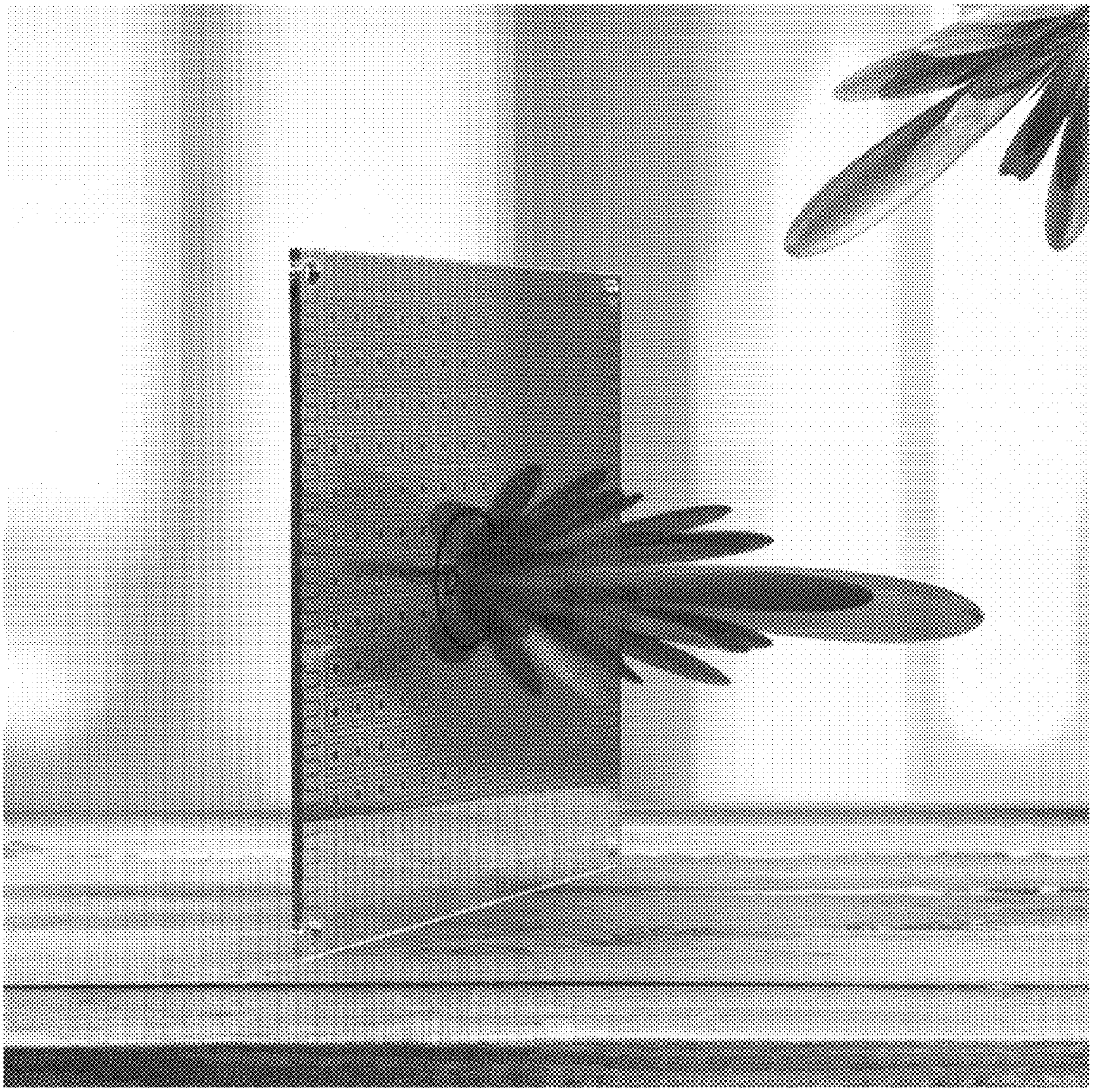
FIG. 11 is a conceptual representation of an example of a metasurface configured to operate in a reflection mode, in accordance with various example embodiments and implementations of the subject disclosure.
Figure 12:
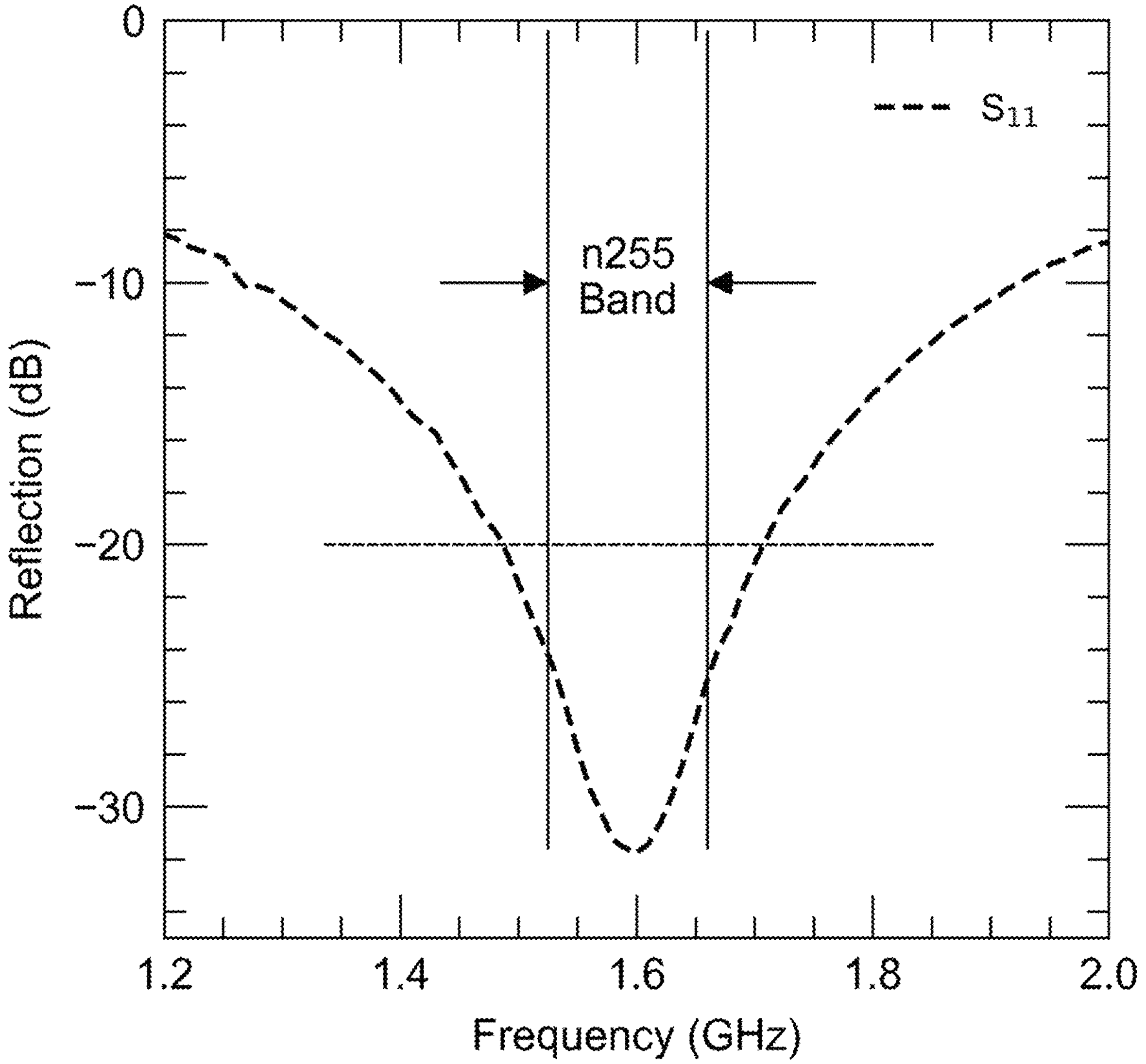
FIG. 12 is a graphical representation of example simulated reflection performance of a unit-cell for a metasurface with a metallic backplane attached for operating in a reflection mode over the n255 frequency band, in accordance with various example embodiments and implementations of the subject disclosure.
Figure 13:
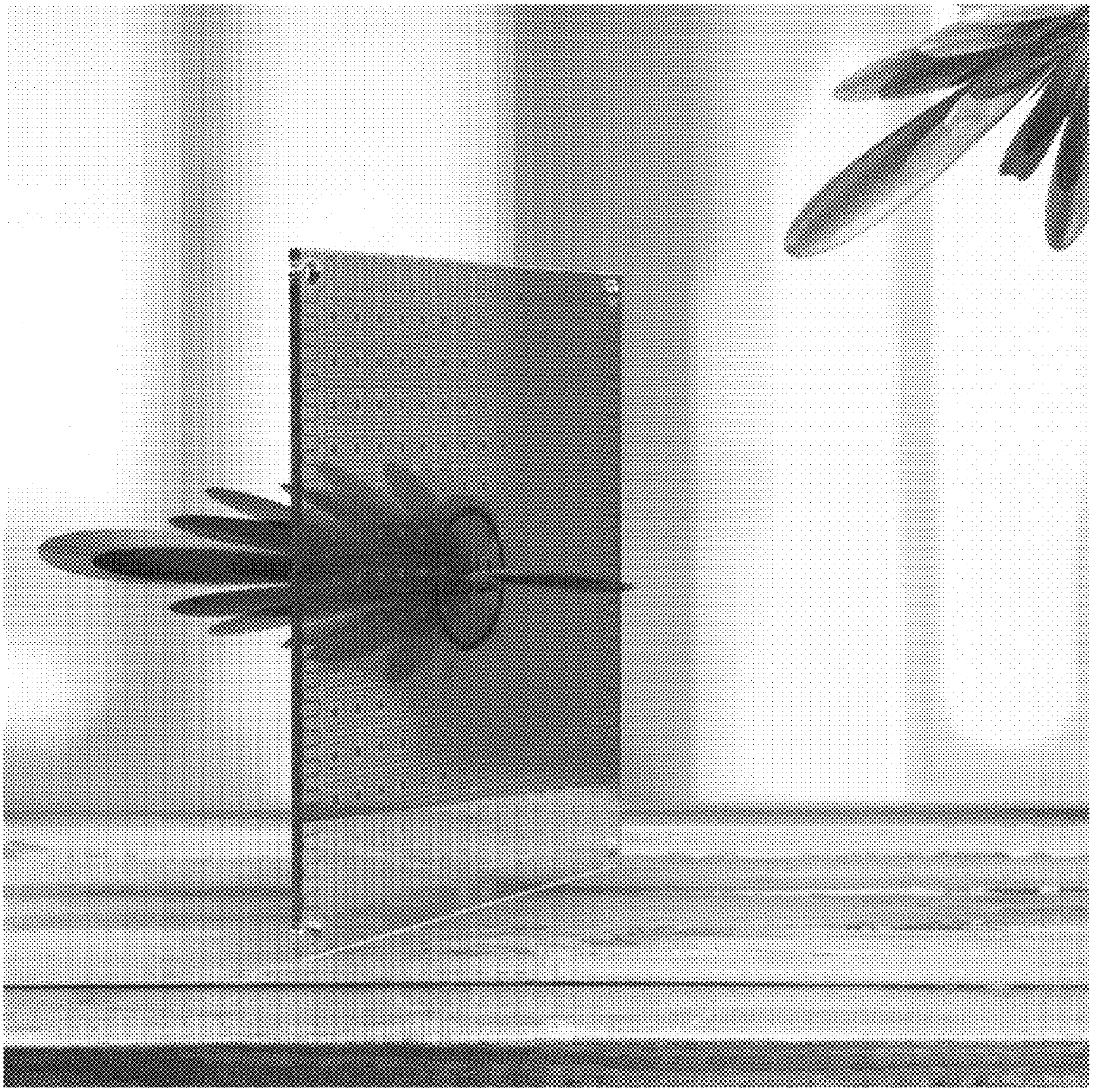
FIG. 13 is a conceptual representation of an example of a metasurface configured to operate in a transmission mode, in accordance with various example embodiments and implementations of the subject disclosure.
Figure 14:
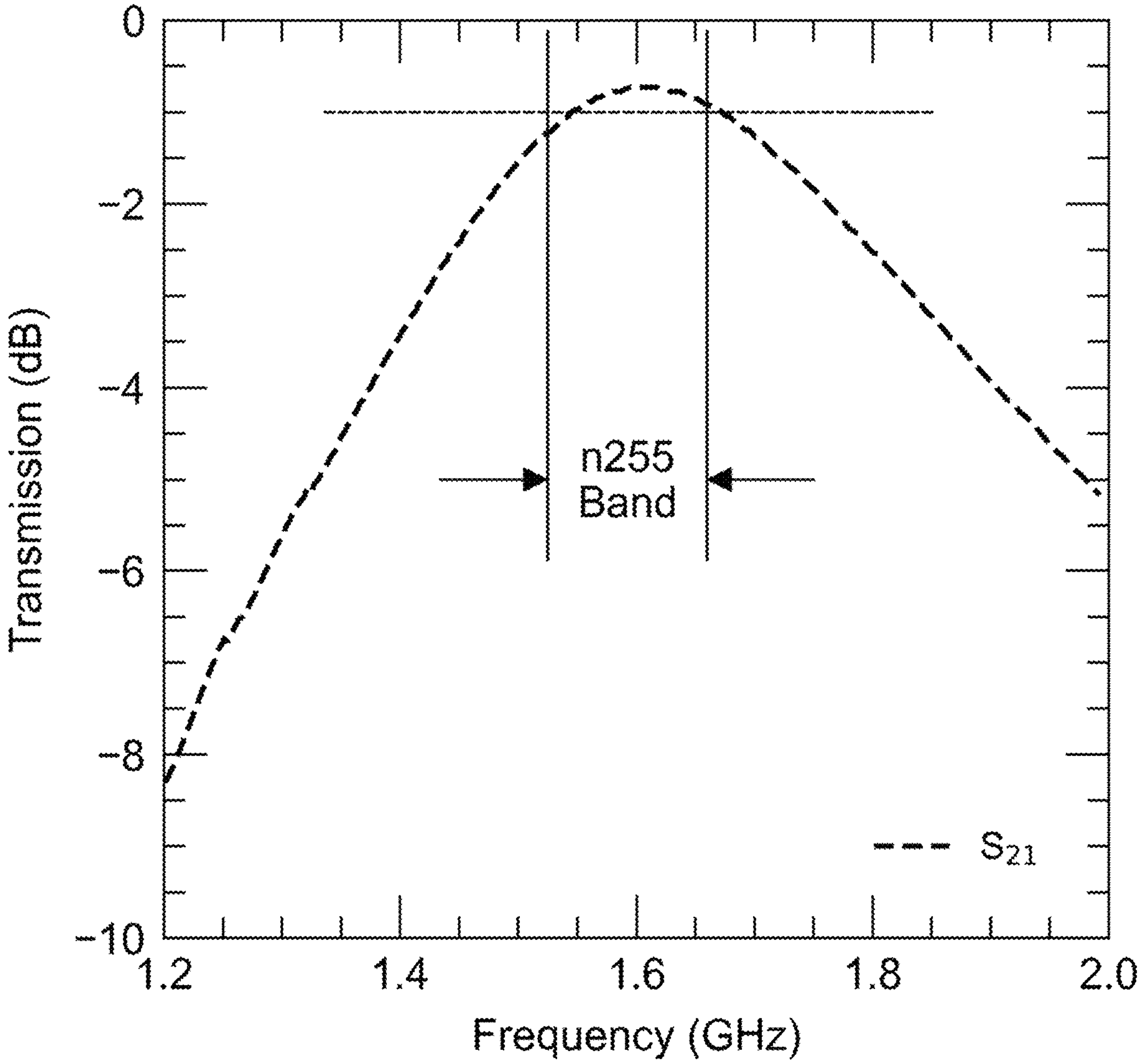
FIG. 14 is a graphical representation of example simulated transmission performance of a unit-cell of a metasurface with no metallic backplane for operating in a transmission mode over the n255 frequency band, in accordance with various example embodiments and implementations of the subject disclosure.

For evaluation purposes, the metasurface parameters were designed for a few frequencies in FR1 and FR2 bands to prove the viability of the technology described herein. One frequency band selected was the n255 band (1.6 GHZ) for its wide adoption in North America, with a portable dual mode metasurface designed to operate between the entire n255 band to cover both uplink and downlink communications. The operation of the designed metasurface in reflection mode along with its optimized performance in the n255 band is shown in FIGS. 11 and 12, and similarly, the metasurface in transmission mode with its performance is depicted in FIGS. 13 and 14. FIG. 11 shows a rendered concept of a metasurface operating in the reflection mode. FIG. 12 shows the EM simulated reflection of the unit-cell for the portable metasurface over the n255 band with the metallic back plane attached.

FIG. 13 shows a rendered concept of a metasurface operating in the transmission mode. FIG. 14 shows the EM simulated transmission of the unit-cell for the portable metasurface over the n255 band with the metallic back plane detached.

The electromagnetic response of the unit cell was evaluated using an industry standard high frequency EM simulation tool. As depicted in FIG. 12, the panel's operation in reflection mode is characterized by a signal reflection magnitude $S_{11}$ of ≈−32 dB, indicating that the panel is reflecting nearly all of the incoming signal. Conversely, FIG. 14 illustrates the panel's performance in transmission mode, where the signal transmission magnitude $S_{21}$ is ≈−0.7 dB, which means the metasurface panel allows almost all of the incoming signal to pass through.

While the FR2 band has not been standardized yet, for evaluation purposes 19 GHz was selected for uplink communications and 28 GHz for downlink communications. Note that one metasurface that was designed for 28 GHz has experimentally measured a 35 dB gain, which is adequate to cancel out the maximum attenuation encountered in standard building infrastructures; thus for 28 GHz, experimental measured data demonstrates that the technology described herein works for millimeter wave metasurfaces, indicating the desirability of such metasurfaces for non-terrestrial network direct-to-everything links.

Figure 15:
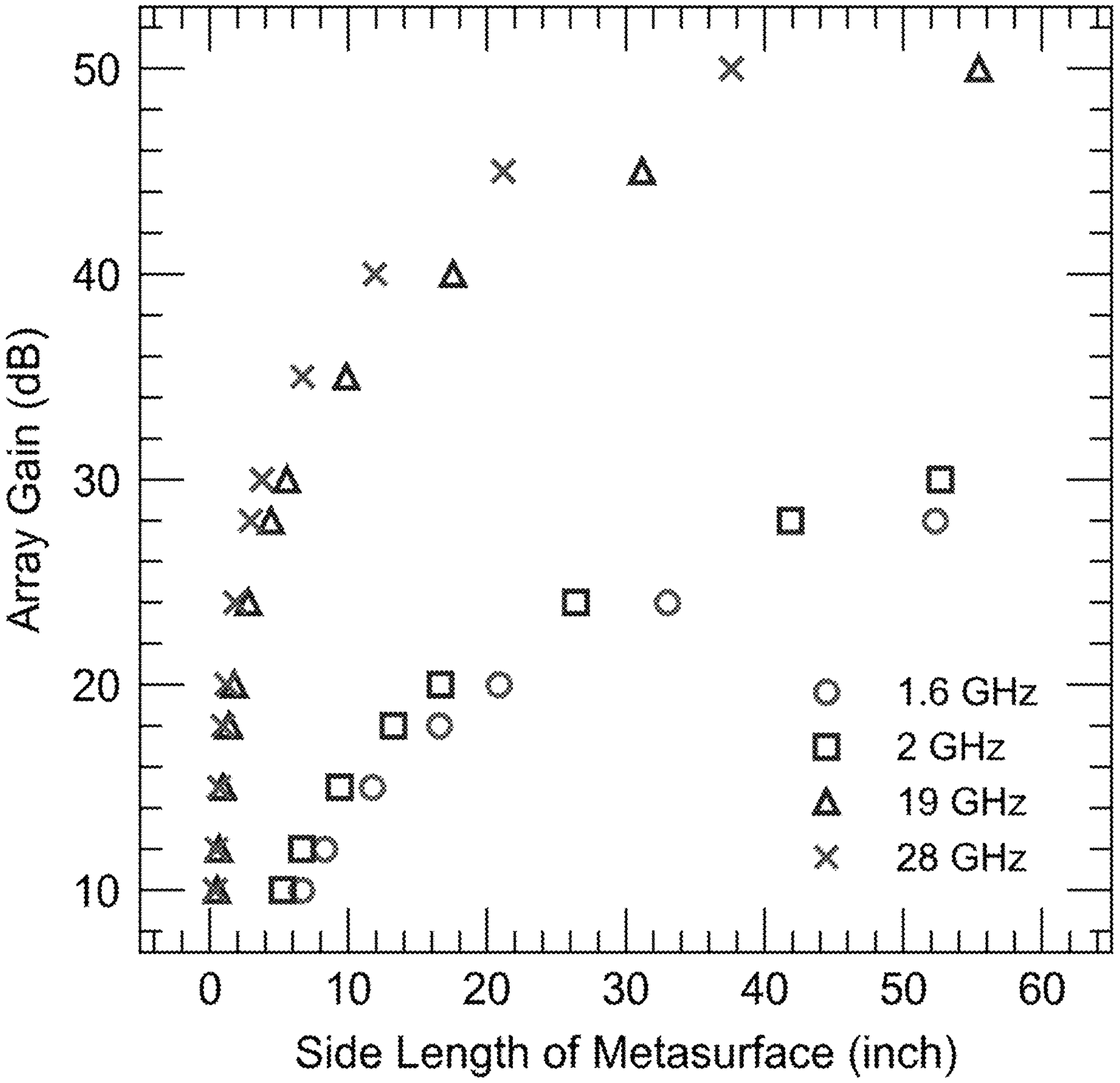
FIG. 15 is a graphical representation of an example comparison of the side length of a metasurface for a desired array gain for different non-terrestrial network lower frequency bands and higher frequency bands, in accordance with various example embodiments and implementations of the subject disclosure.
Figure 16:
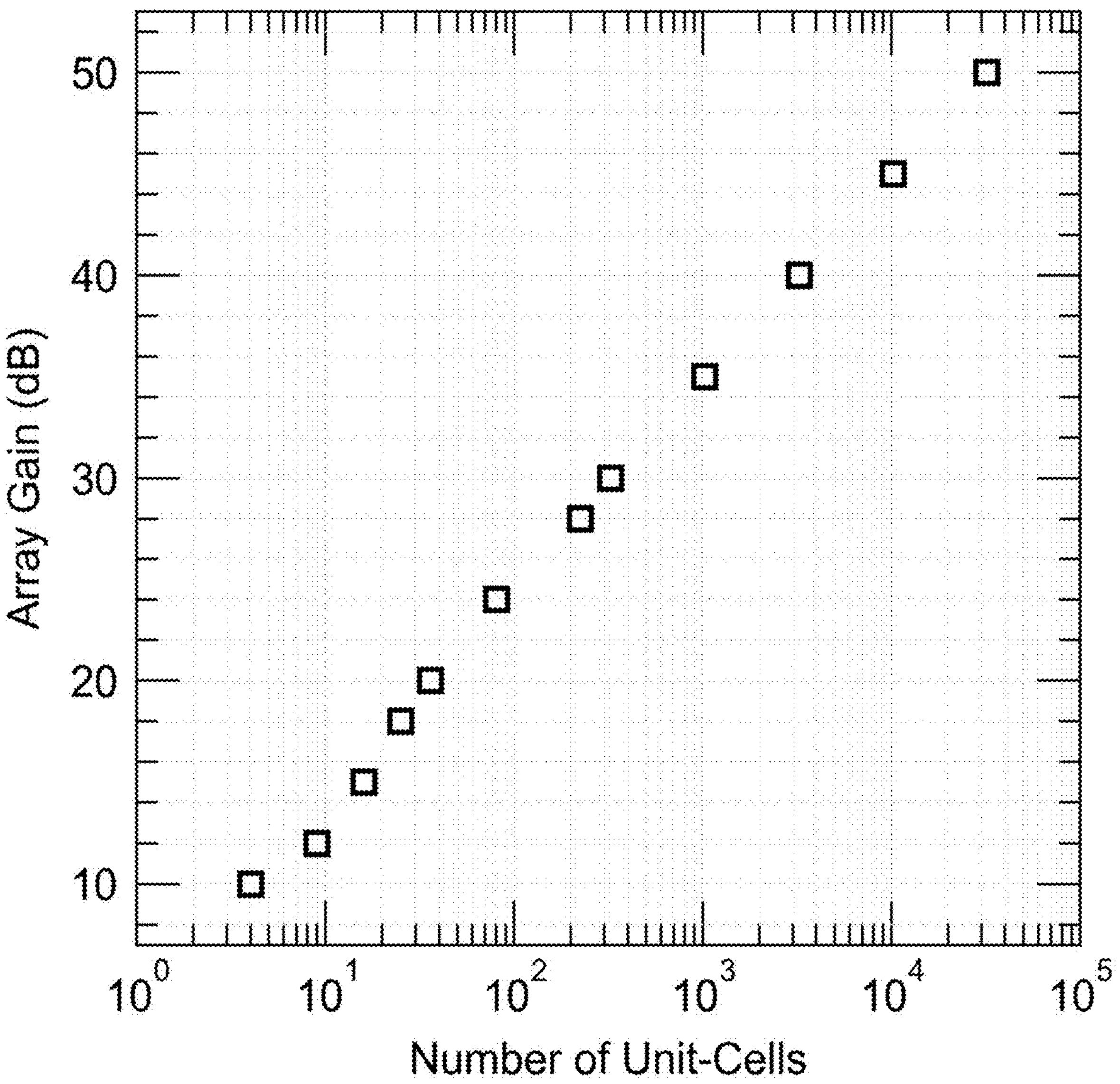
FIG. 16 is a graphical representation of example total numbers of unit-cells configured on metasurface panels for specific array gains for different frequencies, in accordance with various example embodiments and implementations of the subject disclosure.

FIG. 15 shows a comparison of the side length of the metasurface for a desired array gain for different non-terrestrial network frequency bands. FIG. 16 shows the total numbers of unit-cells configured on a panel for a specific array gain. More particularly, the metasurface described herein is scalable and thus offers a choice on the size and gain, in which FIG. 15 depicts the relationship between the physical dimensions of a metasurface and its performance in terms of array gain at various non-terrestrial network frequency bands. As can be seen in FIG. 15, for chosen frequencies, as the side length of the metasurface increases (for the same design and fabrication materials), the array gain also increases.

This attests to the relationship that a larger physical aperture (larger number of unit cells in the array) of the metasurface usually results in a higher gain. Notably, at higher frequencies such as 19 GHz and especially at 28 GHz, the gain increases significantly even with a smaller increase in the side length of the metasurface. This indicates that operating at higher frequencies may allow for more compact metasurfaces to achieve high gains, which facilitates a metasurface suitable for carrying by a user, such as if a user travels to a remote area where non-terrestrial network service is the best way to keep connected with the rest of the world. Similarly, in FIG. 16, the plot indicates that as the number of unit-cells in the metasurface increases, the array gain also increases. This relationship is expected, as more unit-cells typically mean a greater ability to shape and direct the electromagnetic waves, leading to higher gain. Note that the number of unit cells is not frequency dependent.

The limitation of each metasurface supporting only one frequency band will be diminished as 3GPP standardizes more bands for the non-terrestrial network broadband market. From a user's point of view, once a user subscribes to the non-terrestrial network, the service link frequency is already known for a designated region, such that the user can purchase a metasurface that performs for the relevant frequency in the region it will be deployed.

In general, non-terrestrial network airborne networks may be intra-continent, or span across oceans and multiple continents, as a non-terrestrial network is a global network. By way of example, consider the travels/life of a data packet in a system-level end-to-end network as generally represented in FIG. 17, in which acronyms include inter-satellite link (ISL), low earth orbit (LEO) and high-altitude platform systems (HAPS).

Figure 17:
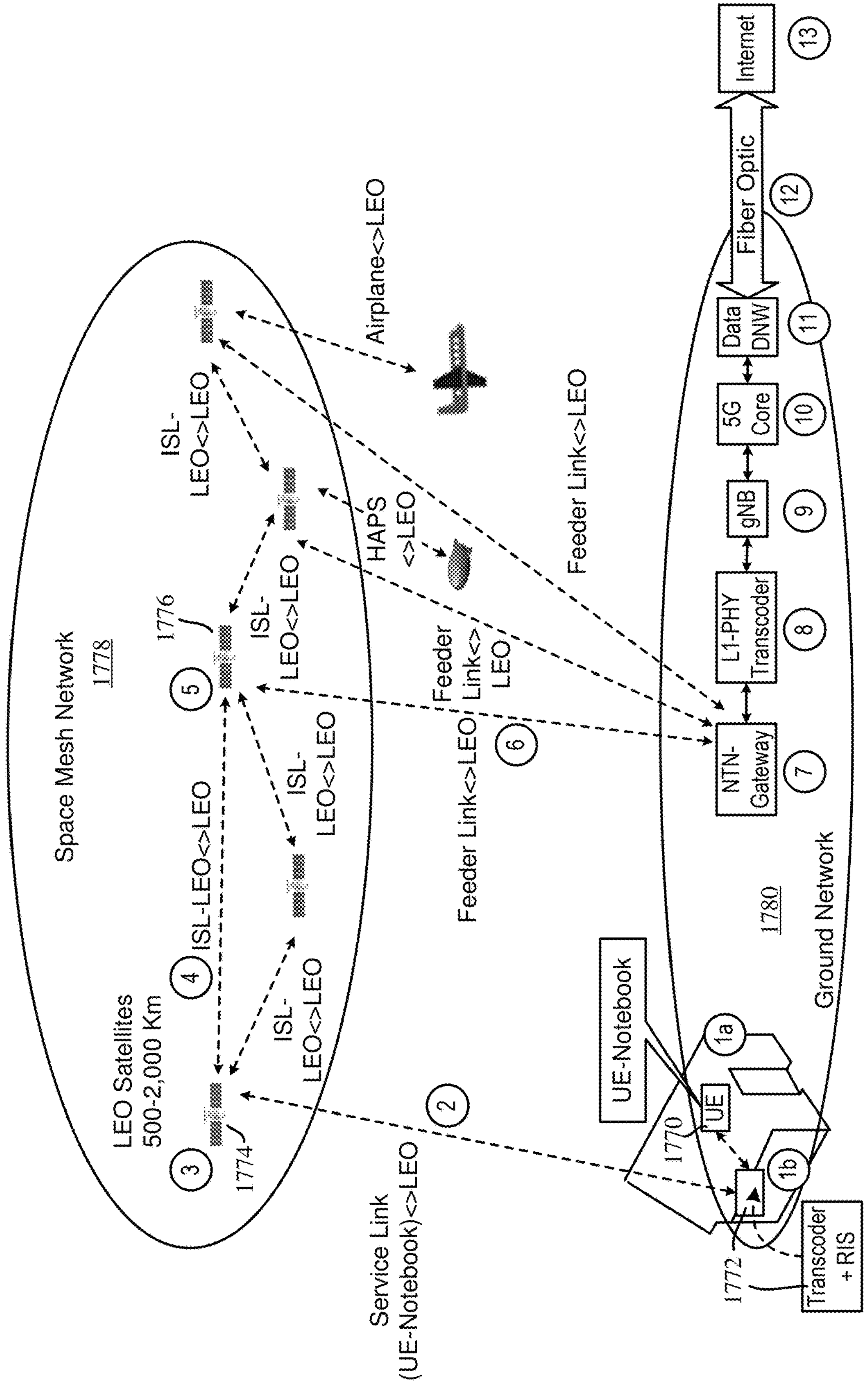
FIG. 17 is a representation of an example system-level end-to-end network showing how a data packet is communicated from an indoor notebook, via a metasurface, to and from a space mesh network, in accordance with various example embodiments and implementations of the subject disclosure.

The example of FIG. 17 shows a non-terrestrial network direct-to-device end-to-end deployment of a UE (notebook computer) and provides a life-of-a-packet description, in which circled numerals represent communications (alphanumerically labeled arrows) and components/component operations (numerically labeled blocks). Analysis of the packet starts inside a home, e.g., on the East coast of the United States, in which a notebook computer 1770 is shielded by a house roof, walls, windows, and/or doors.

Labeled arrow (1*a*) represents packets leaving the notebook 1770. Arrow (1*b*) represents, through RF transmission, the 3GPP 5G NR packets entering the L1-PHY transcoder 1772, (which in this example includes or is coupled to a RIS, whether integrated or independent). Inside the L1-PHY transcoder 1772, the packets are translated/converted (UE RFFE→decode→packet-level→encode→Satcom RFFE) from the 5G NR air-interface-to-Satcom air-interface. The packets leave the L1-PHY transcoder block and enter the RIS technology. Packets are reflected out of the interior of the home using the RIS panel technology described herein.

Arrow (2) represents the reflected packets traveling through the (e.g., DVB-compliant) Satcom air interface to a first LEO satellite 1774 using the service-link. Once inside the satellite (labeled block (3)), the Satcom channel packet is repeated (amplified/frequency-converted).

At arrow (4), the packet (as converted to Satcom) leaves the first LEO satellite 1774 through the space mesh network 1778 using the "Optical Inter-Satellite Arrow Links (ISL)", more specifically the "ISL-LEO-LEO" link. The space mesh network 1778 is basically a router/switch in space, represented by arrow (4) passing the packets through the space network; (note that multiple space network hops are possible, LEO, MEO (medium earth orbit) and/or GEO (geostationary earth orbit) satellite hops). The satellite physical interface is the inter-satellite links (ISL), similar to the optical or RF interfaces used in ground networks.

Once the Satcom (converted from 5G NR) packet gets close its destination, in this example it is in the western part of the United States, the packet terminates (labeled block (5)) inside the second LEO satellite 1776. As represented by arrow (6), the packet is then exported out of the second LEO satellite 1776 through the radio-frequency (RF) feeder-link downlink connection. Thus, as represented by block (7), the packets pass through the non-terrestrial network gateway; the output stream is the DVB-compliant Satcom protocol.

The Satcom L1-PHY stream protocol needs to be converted back to the original 3GPP-compliant 5G NR terrestrial protocol, which is done using a second L1-PHY transcoder (labeled block (8)). The converted 3GPP-compliant 5G NR data is communicated at block (9) through the gNodeB (gNB 5G Radio Access Network), then at block (10) to the 5G Core (5GC). As represented by block (11), via the standard data network, the data network block is the transcoder-block from the mobile-network to standard ground data network. The 5G NR tunneled packet is demodulated back to the original baseband packet format and processed into the data network as a typical Internet Protocol (IP) packet, thus processed through commercial-off-the-shelf routers and switches.

As represented by arrow (12), once the IP packet routes through the traditional fiber data network (DNW), the packet enters the Internet connection. At block (13), once the data is retrieved from the Internet, the read-return packet can be sent through the same exact ground-network 1780 and space mesh network 1778, returning the read-return packet to the notebook UE 1770.

Figure 18:
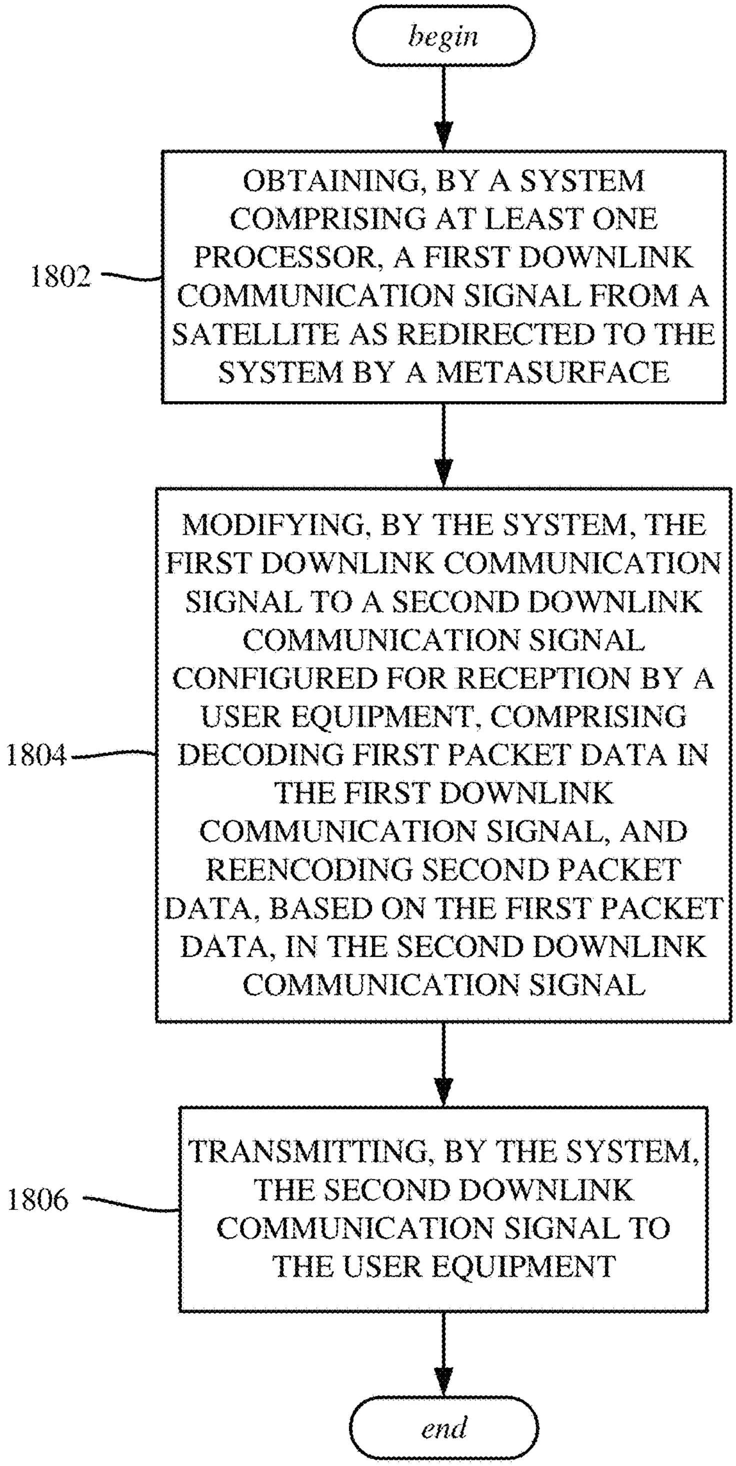
FIG. 18 is a flow diagram showing example operations related to modifying a first downlink communication signal to a second downlink communication signal including decoding first packet data in the first downlink communication signal, and reencoding second packet data, based on the first packet data, in the second downlink communication signal, in accordance with various example embodiments and implementations of the subject disclosure.

One or more example implementations and embodiments, such as corresponding to example operations of a method, or computer executable instructions/components are represented in FIG. 18. Example operation 1802 represents obtaining, by a system comprising at least one processor, a first downlink communication signal from a satellite as redirected to the system by a metasurface. Example operation 1804 represents modifying, by the system, the first downlink communication signal to a second downlink communication signal configured for reception by a user equipment, comprising decoding first packet data in the first downlink communication signal, and reencoding second packet data, based on the first packet data, in the second downlink communication signal. Example operation 1806 represents transmitting, by the system, the second downlink communication signal to the user equipment.

The first packet data in the first downlink communication signal can correspond to a satcom radio frequency (RF) front-end control interface (RFEE) protocol, and the second packet data in the second downlink communication signal can correspond to a fifth generation new radio (5G NR) RFEE protocol.

Modifying the first downlink communication signal to the second downlink communication signal further can include converting a frequency of the first downlink communication signal from a satellite communications band to a user equipment communications band.

Modifying the first downlink communication signal to the second downlink communication signal further can include at least one of: compensating for doppler shift of the satellite, performing a re-clocking function based on the first downlink communication signal, amplifying the first downlink signal, performing power level adjustment based on the first downlink communication signal, performing frequency equalization with respect to the second downlink communication signal as frequency-converted, or performing negative-slope compensation with respect to the second downlink communication signal as frequency-converted.

Further operations can include obtaining, by the system, a third uplink communication signal from the user equipment, modifying, by the system, the third uplink communication signal to a fourth uplink communication signal configured for reception by the satellite, which can include decoding third packet data in the third uplink communication signal, and reencoding fourth packet data, based on the third packet data, in the fourth uplink communication signal, and transmitting, by the system, the fourth uplink communication signal to the satellite via the metasurface. The third packet data in the third uplink communication signal can correspond to a fifth generation new radio (5G NR) radio frequency (RF) front-end control interface (RFEE) protocol, and the fourth packet data in the fourth uplink communication signal can correspond to a satcom RFEE protocol.

Modifying the third downlink communication signal to the fourth downlink communication signal further can include converting a frequency of the third downlink communication signal from a satellite communications band to a user equipment communications band.

Modifying the third downlink communication signal to the fourth downlink communication signal further can include at least one of: compensating for doppler shift of the satellite, performing a re-clocking function based on the third downlink communication signal, amplifying the third downlink signal, performing power level adjustment based on the third downlink communication signal, performing frequency equalization with respect to the fourth downlink communication signal as frequency-converted, or performing negative-slope compensation with respect to the fourth downlink communication signal as frequency-converted.

One or more embodiments can be embodied in a system, such as described and represented in the drawing figures herein. The system can include a metasurface having a line-of-sight field of view to a satellite, and a transcoder that converts first non-terrestrial communication signals from the satellite received by the transcoder as redirected via the metasurface, to first terrestrial communication signals for at least one user equipment, and that converts second terrestrial communication signals received by the transcoder from the at least one user equipment, to second non-terrestrial communication signals for redirection by the metasurface to the satellite. The transcoder can include packet conversion logic to decode first packet data in the first non-terrestrial communication signals from the satellite, and reencode second packet data, based on the first packet data, in the second terrestrial communication signals to the at least one user equipment, and to decode third packet data in the second terrestrial communication signals from the at least one user equipment, and reencode fourth packet data, based on the third packet data, in the second non-terrestrial communication signals to the satellite.

The transcoder (e.g., the L1-PHY transcoder) can include a repeater to perform at least one of: re-clocking operations, amplification operations, or power level adjustment operations with respect to at least one of: the first non-terrestrial communication signals, the first terrestrial communication signals, the second non-terrestrial communication signals, or the second terrestrial communication signals.

The transcoder can include a frequency converter that converts downlink communication signals of the first non-terrestrial communication signals from the satellite in a satellite radio frequency (RF) band to downlink user equipment communication signals to the at least one user equipment in a user equipment RF band, and converts uplink communication signals of the second terrestrial communication signals from the at least one user equipment in the user equipment RF band to uplink satellite communication signals to the satellite in the satellite RF band.

The transcoder can include doppler shift compensation circuitry that corrects for doppler shift based on a current position of the satellite.

The transcoder can include equalization logic to equalize downlink frequency of the downlink communication signals as converted by the frequency converter, and equalize uplink frequency of the uplink communication signals as converted by the frequency converter, and wherein the transcoder can include negative slope compensation circuitry to compensate for loss in the downlink frequency of the downlink communication signals as converted by the frequency converter, and compensate for loss in the uplink frequency of the uplink communication signals as converted by the frequency converter.

The metasurface can receive the first non-terrestrial communication signals from the satellite, and can receive the second terrestrial communication signals from the transcoder, and increases at least one of: a first amplitude of the first non-terrestrial communication signals from the satellite based on a first array gain, or a second amplitude of the second terrestrial communication signals from the transcoder based on a second array gain.

The metasurface can receive the first non-terrestrial communication signals from the satellite, and can receive the second terrestrial communication signals from the transcoder, and changes at least one of at least one of: a first phase of the first non-terrestrial communication signals, or a second phase of the second terrestrial communication signals.

The metasurface can receive the first non-terrestrial communication signals from the satellite, and can receive the second terrestrial communication signals from the transcoder, and can be coupled to radio frequency circuitry that performs at least one of: distortion compensation, or signal leveling, on at least one of: the second terrestrial communication signals, or the first non-terrestrial communication signals.

The transcoder can be integrated into the metasurface, or the metasurface can be integrated into the transcoder.

The transcoder can be deployed as a standalone device, or can be configured for coupling to a computing device.

One or more embodiments can be embodied in a system, such as described and represented in the drawing figures herein. The system can include a metasurface deployed to have a line-of-sight field of view to a satellite, in which the metasurface receives non-terrestrial communication signals from the satellite, and a transcoder, coupled to at least one antenna, that obtains the non-terrestrial communication signals as redirected by the metasurface to the transcoder via the at least one antenna. The transcoder can include a packet converter that decodes first packet data in the non-terrestrial communication signals, and reencodes second packet data, based on the first packet data, to the terrestrial communication signals. The transcoder can transmit the terrestrial communication signals via the at least one antenna to a user equipment.

The non-terrestrial communication signals can be first non-terrestrial communication signals, the terrestrial communication signals can be first terrestrial communication signals, the transcoder can receive second terrestrial communication signals from the user equipment via the at least one antenna, and can transmit second non-terrestrial communication signals, via the at least one antenna, to the metasurface for redirection to the satellite. The packet converter can be a first packet converter, and the transcoder can include a second packet converter that decodes third packet data in the second terrestrial communication signals, and reencodes fourth packet data, based on the third packet data, in the second non-terrestrial communication signals. The transcoder further can include a repeater that performs at least one of: re-clocking operations, amplification operations, or power level adjustment operations with respect to the first non-terrestrial communication signals, and can perform at least one of: re-clocking operations, amplification operations, or power level adjustment operations with respect to the second terrestrial communication signals. The transcoder further can include a doppler shift adjuster that corrects the first non-terrestrial communication signals for doppler shift based on a current position of the satellite, and corrects the second non-terrestrial communication signals for doppler shift based on the current position of the satellite, and a frequency converter that converts the first non-terrestrial communication signals in a satellite radio frequency (RF) band to the first terrestrial communication signals in a user equipment RF band, and converts the second terrestrial communication signals in the user equipment RF band to the second non-terrestrial communication signals in the satellite RF band. The transcoder further can include an equalizer that equalizes the first terrestrial communication signals as converted by the frequency converter, and equalizes the second non-terrestrial communication signals as converted by the frequency converter, and a negative slope adjuster that compensates for loss in the first terrestrial communication signals as converted by the frequency converter, and compensates for loss in the second non-terrestrial communication signals as converted by the frequency converter.

As can be seen, the technology described herein provides L1-PHY transcoder technology and metasurface (RIS), in which the transcoder converts between the satcom-air-interface and the 3GPP-5G-NR-air-interface, including decoding and reencoding data packets at the L1-PHY packet level.

This allows user equipment that communicates using the 3GPP 5G NR mobile wireless language to communicate with satellites of a satellite constellation, both legacy constellations and newer constellations recently deployed, by passing the signals through the L1-PHY transcoder box. For non-LoS scenarios, e.g., indoor-located user equipment, communication with non-terrestrial network satellites is facilitated by using metasurface (reconfigurable intelligent surface) technology.

In addition to the L1-PHY transcoder technology and functionality, the transcoder described herein can be implemented in a relatively low cost, reasonable-intelligence (hardware and/or software solution), for straightforward configuration and operation, e.g., in a small (e.g., cellphone-sized), lightweight Layer-1 physical interface (L1-PHY) transcoder box. The L1-PHY transcoder can be separated from the RIS components to further lower the cost/complexity.

By decoding signals down to the packet-level using 3GPP 5G NR logic blocks, before reencoding them for satellite satcom communication (and vice versa), the technology ensures high fidelity and low data loss. This maintains the integrity of the data, while allowing efficient transcoding between different communication protocols.

A metasurface (RIS) of an L1-PHY transcoder system provides the LoS connectivity to the satellites. In sum, the L1-PHY transcoder and RIS technology described herein bridges communication gap between a non-terrestrial satcom interface and a 3GPP terrestrial air-interface to allow a UE to wirelessly and directly leverage the existing satellite frequency band to access satcom broadband services.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:

obtaining, by a system comprising at least one processor, a first downlink communication signal from a satellite as redirected to the system by a metasurface;

modifying, by the system, the first downlink communication signal to a second downlink communication signal configured for reception by a user equipment, comprising:

decoding first packet data in the first downlink communication signal, reencoding second packet data, based on the first packet data, in the second downlink communication signal, converting a frequency of the first downlink communication signal from a satellite communications band to a user equipment communications band, equalizing a downlink frequency of the second downlink communication signal as frequency-converted, and compensating, via negative slope compensation circuitry, for loss in the downlink frequency of the second downlink communication signal as frequency-converted; and transmitting, by the system, the second downlink communication signal to the user equipment.

2. The method of claim 1, wherein the first packet data in the first downlink communication signal corresponds to a satcom radio frequency (RF) front-end control interface (RFEE) protocol, and wherein the second packet data in the second downlink communication signal corresponds to a fifth generation new radio (5G NR) RFEE protocol.

3. The method of claim 1, wherein the modifying of the first downlink communication signal to the second downlink communication signal further comprises at least one of: compensating for doppler shift of the satellite, performing a re-clocking function based on the first downlink communication signal, amplifying the first downlink communication signal, performing power level adjustment based on the first downlink communication signal, performing frequency equalization with respect to the second downlink communication signal as frequency-converted, or performing negative-slope compensation with respect to the second downlink communication signal as frequency-converted.

4. The method of claim 1, further comprising:

obtaining, by the system, a third uplink communication signal from the user equipment;

modifying, by the system, the third uplink communication signal to a fourth uplink communication signal configured for reception by the satellite, comprising decoding third packet data in the third uplink communication signal, and reencoding fourth packet data, based on the third packet data, in the fourth uplink communication signal; and transmitting, by the system, the fourth uplink communication signal to the satellite via the metasurface.

5. The method of claim 4, wherein the third packet data in the third uplink communication signal corresponds to a fifth generation new radio (5G NR) radio frequency (RF) front-end control interface (RFEE) protocol, and wherein the fourth packet data in the fourth uplink communication signal corresponds to a satcom RFEE protocol.

6. The method of claim 4, wherein the modifying of the third uplink communication signal to the fourth uplink communication signal further comprises converting a frequency of the third uplink communication signal from a satellite communications band to a user equipment communications band.

7. The method of claim 6, wherein the modifying of the third uplink communication signal to the fourth uplink communication signal further comprises at least one of: compensating for doppler shift of the satellite, performing a re-clocking function based on the third uplink communication signal, amplifying the third uplink communication signal, performing power level adjustment based on the third uplink communication signal, performing frequency equalization with respect to the fourth uplink communication signal as frequency-converted, or performing negative-slope compensation with respect to the fourth uplink communication signal as frequency-converted.

8. A system, comprising:

a metasurface having a line-of-sight field of view to a satellite; and a transcoder that converts first non-terrestrial communication signals from the satellite received by the transcoder as redirected via the metasurface, to first terrestrial communication signals for at least one user equipment, and that converts second terrestrial communication signals received by the transcoder from the at least one user equipment, to second non-terrestrial communication signals for redirection by the metasurface to the satellite, wherein the transcoder comprises packet conversion logic to decode first packet data in the first non-terrestrial communication signals from the satellite, and reencode second packet data, based on the first packet data, in the second terrestrial communication signals to the at least one user equipment, and to decode third packet data in the second terrestrial communication signals from the at least one user equipment, and reencode fourth packet data, based on the third packet data, in the second non-terrestrial communication signals to the satellite, and wherein the transcoder further comprises equalization logic to equalize downlink frequency of the first non-terrestrial communication signals as converted by a frequency converter, and equalize uplink frequency of the second terrestrial communication signals as converted by the frequency converter, and wherein the transcoder comprises negative slope compensation circuitry to compensate for loss in the downlink frequency of the first non-terrestrial communication signals as converted by the frequency converter, and compensate for loss in the uplink frequency of the second terrestrial communication signals as converted by the frequency converter.

9. The system of claim 8, wherein the transcoder comprises a repeater to perform at least one of: re-clocking operations, amplification operations, or power level adjustment operations with respect to at least one of: the first non-terrestrial communication signals, the first terrestrial communication signals, the second non-terrestrial communication signals, or the second terrestrial communication signals.

10. The system of claim 8, wherein the transcoder comprises the frequency converter that converts downlink communication signals of the first non-terrestrial communication signals from the satellite in a satellite radio frequency (RF) band to downlink user equipment communication signals to the at least one user equipment in a user equipment RF band, and converts uplink communication signals of the second terrestrial communication signals from the at least one user equipment in the user equipment RF band to uplink satellite communication signals to the satellite in the satellite RF band.

11. The system of claim 8, wherein the transcoder comprises doppler shift compensation circuitry that corrects for doppler shift based on a current position of the satellite.

12. The system of claim 8, wherein the metasurface receives the first non-terrestrial communication signals from the satellite, and receives the second terrestrial communication signals from the transcoder, and increases at least one of: a first amplitude of the first non-terrestrial communication signals from the satellite based on a first array gain, or a second amplitude of the second terrestrial communication signals from the transcoder based on a second array gain.

13. The system of claim 8, wherein the metasurface receives the first non-terrestrial communication signals from the satellite, and receives the second terrestrial communication signals from the transcoder, and changes at least one of: a first phase of the first non-terrestrial communication signals, or a second phase of the second terrestrial communication signals.

14. The system of claim 8, wherein the metasurface receives the first non-terrestrial communication signals from the satellite, and receives the second terrestrial communication signals from the transcoder, and is coupled to radio frequency circuitry that performs at least one of: distortion compensation, or signal leveling, on at least one of: the second terrestrial communication signals, or the first non-terrestrial communication signals.

15. The system of claim 8, wherein the transcoder is integrated into the metasurface, or wherein the metasurface is integrated into the transcoder.

16. The system of claim 8, wherein the transcoder is deployed as a standalone device, or is configured for coupling to a computing device.

17. A system, comprising:

a metasurface deployed to have a line-of-sight field of view to a satellite, wherein the metasurface receives first non-terrestrial communication signals from the satellite; and a transcoder, coupled to at least one antenna, that:

obtains the first non-terrestrial communication signals as redirected by the metasurface to the transcoder via the at least one antenna, the transcoder comprising:

a packet converter that decodes first packet data in the first non-terrestrial communication signals, and reencodes second packet data, based on the first packet data, in first terrestrial communication signals, and receives second terrestrial communication signals from user equipment via the at least one antenna, and transmits second non-terrestrial communication signals, via the at least one antenna, to the metasurface for redirection to the satellite, wherein the transcoder transmits the first terrestrial communication signals via the at least one antenna to the user equipment, and wherein the transcoder further comprises a negative slope adjuster that compensates for loss in the first terrestrial communication signals as converted by a frequency converter, and compensates for loss in the second non-terrestrial communication signals as converted by the frequency converter.

18. The system of claim 17, wherein the packet converter is a first packet converter, and wherein the transcoder further comprises:

a second packet converter that decodes third packet data in the second terrestrial communication signals, and reencodes fourth packet data, based on the third packet data, in the second non-terrestrial communication signals, a repeater that performs at least one of: re-clocking operations, amplification operations, or power level adjustment operations with respect to the first non-terrestrial communication signals, and performs at least one of: re-clocking operations, amplification operations, or power level adjustment operations with respect to the second terrestrial communication signals, a doppler shift adjuster that corrects the first non-terrestrial communication signals for doppler shift based on a current position of the satellite, and corrects the second non-terrestrial communication signals for doppler shift based on the current position of the satellite, wherein the frequency converter converts the first non-terrestrial communication signals in a satellite radio frequency (RF) band to the first terrestrial communication signals in a user equipment RF band, and converts the second terrestrial communication signals in the user equipment RF band to the second non-terrestrial communication signals in the satellite RF band, and an equalizer that equalizes the first terrestrial communication signals as converted by the frequency converter, and equalizes the second non-terrestrial communication signals as converted by the frequency converter.

19. The system of claim 17, wherein the transcoder is integrated into the metasurface, or wherein the metasurface is integrated into the transcoder.

20. The system of claim 17, wherein the metasurface receives the first non-terrestrial communication signals from the satellite, and receives the second non-terrestrial communication signals from the transcoder, and increases at least one of: a first amplitude of the first non-terrestrial communication signals from the satellite based on a first array gain, or a second amplitude of the second non-terrestrial communication signals from the transcoder based on a second array gain.

* * * * *